(12) United States Patent
Yamamoto et al.

(10) Patent No.: US 8,419,060 B2
(45) Date of Patent: Apr. 16, 2013

(54) SIDE AIRBAG SYSTEM AND METHOD OF MANUFACTURING SIDE AIRBAG

(75) Inventors: Kazuhito Yamamoto, Toyota (JP); Masanori Takagawa, Yokohama (JP)

(73) Assignees: Toyota Jidosha Kabushiki Kaisha, Toyota-shi, Aichi-ken (JP); Key Safety Systems Japan KK, Yokohama, Kanagawa (JP)

( * ) Notice: Subject to any disclaimer, the term of this patent is extended or adjusted under 35 U.S.C. 154(b) by 70 days.

(21) Appl. No.: 13/146,932

(22) PCT Filed: Feb. 10, 2010

(86) PCT No.: PCT/IB2010/000252
§ 371 (c)(1), (2), (4) Date: Jul. 29, 2011

(87) PCT Pub. No.: WO2010/092454
PCT Pub. Date: Aug. 19, 2010

(65) Prior Publication Data
US 2011/0285119 A1    Nov. 24, 2011

(30) Foreign Application Priority Data
Feb. 12, 2009  (JP) .................................. 2009-029946

(51) Int. Cl.
*B60R 21/16* (2006.01)
(52) U.S. Cl.
USPC .................................. 280/743.2; 112/475.08
(58) Field of Classification Search .................. 280/729, 280/730.2, 740; 112/1, 400, 402, 440, 441, 112/475.01, 475.08
See application file for complete search history.

(56) References Cited

U.S. PATENT DOCUMENTS 5,853,191 A * 12/1998 Lachat ........................ 280/730.2
5,895,070 A    4/1999 Lachat
(Continued)

FOREIGN PATENT DOCUMENTS

EP    1 273 486    1/2003
JP    11-157407    6/1999
(Continued)

OTHER PUBLICATIONS

International Search Report in International Application No. PCT/IB2010/000252; Mailing Date: Jun. 4, 2010.

(Continued)

*Primary Examiner* — Joseph Rocca
*Assistant Examiner* — Robert A Coker
(74) *Attorney, Agent, or Firm* — Finnegan, Henderson, Farabow, Garrett & Dunner, LLP

(57) ABSTRACT

In a side airbag system (10), a tether portion (22), which serves as a partition between an upper bag portion (16) and a lower bag portion (18), is formed of upper regions (34U) of a piece of lower base fabric (34), and is formed by sewing the upper regions (34U) of the lower base fabric (34), folded toward a vehicle front side along a fold axis, together. In addition, a tube (24) that distributes inflation gas between the upper bag portion (16) and the lower bag portion (18) extends through the tether portion (22) to the lower bag portion (18) and to the upper bag portion (16). The tube (24) is formed into a cylindrical shape in such a manner that a piece of tube base fabric (36) is sewed to the upper regions (34U) of the lower base fabric (34) and folded toward a vehicle front side along the fold axis and then front ends (36F) of the folded tube base fabric are sewed together in a tube longitudinal direction.

19 Claims, 21 Drawing Sheets

U.S. PATENT DOCUMENTS

| | | | |
|---|---|---|---|
| 7,021,652 B2 * | 4/2006 | Kumagai et al. | 280/729 |
| 8,052,168 B2 * | 11/2011 | Wipasuramonton et al. | 280/730.2 |
| 2003/0006587 A1 * | 1/2003 | Jang et al. | 280/730.2 |
| 2005/0218635 A1 * | 10/2005 | Wipasuramonton et al. | 280/730.2 |
| 2006/0001244 A1 | 1/2006 | Taguchi et al. | |
| 2006/0022441 A1 | 2/2006 | Hayashi et al. | |
| 2009/0212539 A1 * | 8/2009 | Honda et al. | 280/729 |

FOREIGN PATENT DOCUMENTS

| | | |
|---|---|---|
| JP | 11-157410 | 6/1999 |
| JP | 2000-177527 | 6/2000 |
| JP | 2003-501303 | 1/2003 |
| JP | 2003-335208 | 11/2003 |
| JP | 2004-210047 | 7/2004 |
| JP | 2004-262261 | 9/2004 |
| JP | 2004-276808 | 10/2004 |
| JP | 2005-22473 | 1/2005 |
| JP | 2005-82068 | 3/2005 |
| JP | 2005-531451 | 10/2005 |
| JP | 2006-8015 | 1/2006 |
| JP | 2008-184159 | 8/2008 |
| JP | 2009-274516 | 11/2009 |
| JP | 2010-505677 | 2/2010 |
| WO | WO 00/46076 A1 | 8/2000 |
| WO | WO 2004/065179 A1 | 8/2004 |

OTHER PUBLICATIONS

Notification of Reason(s) for Refusal in Japanese Application No. 2009-029946; Drafting Date: Apr. 21, 2011.

Written Opinion of the International Searching Authority in International Application No. PCT/IB2010/000252; Mailing Date: Jun. 4, 2010.

* cited by examiner

F I G . 12
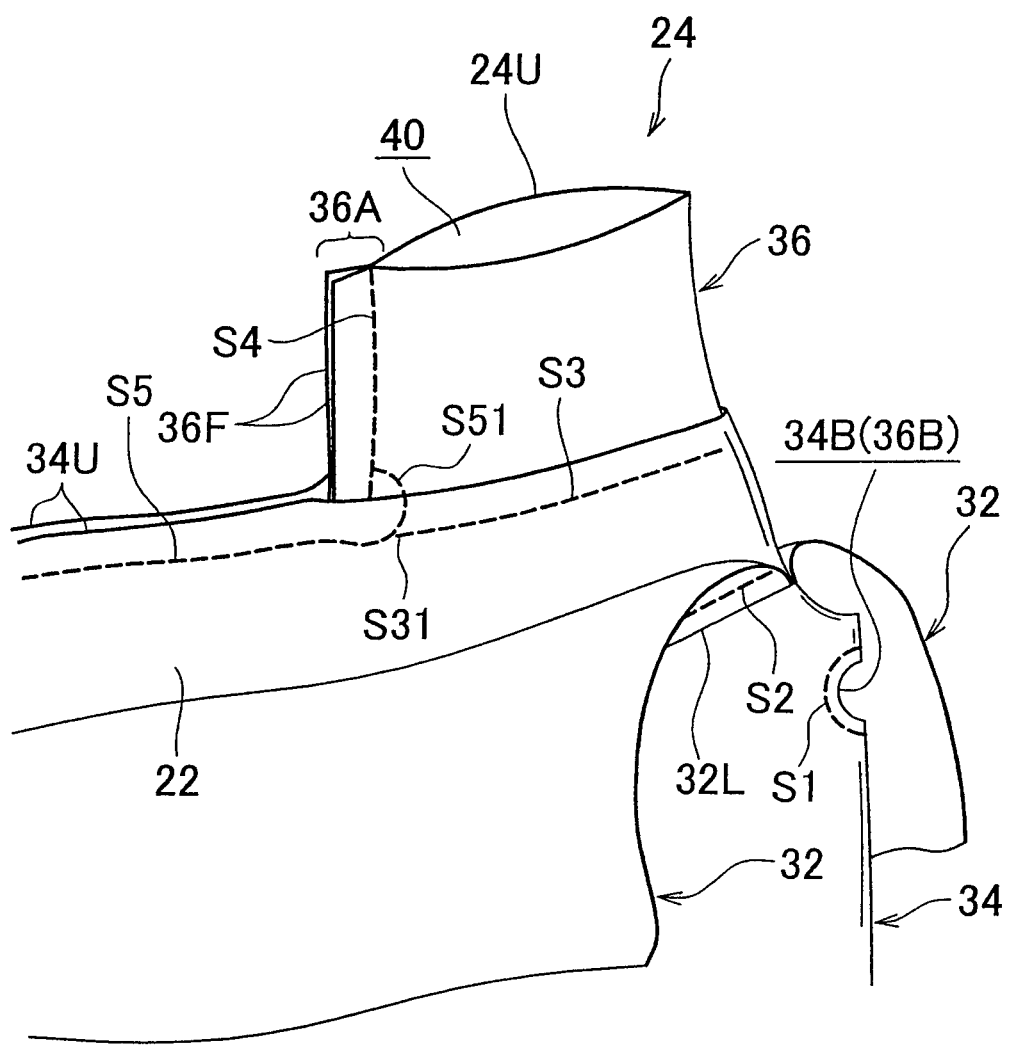

SIDE AIRBAG SYSTEM AND METHOD OF MANUFACTURING SIDE AIRBAG

CROSS-REFERENCE TO RELATED APPLICATIONS

This application is a national phase application of International Application No. PCT/IB2010/000252, filed Feb. 10, 2010, and claims the priority of Japanese Application No. 2009-029946, filed Feb. 12, 2009, the contents of both of which are incorporated herein by reference.

BACKGROUND OF THE INVENTION

1. Field of the Invention

The invention relates to a side airbag system and a method of manufacturing a side airbag.

2. Description of the Related Art

For example, Published Japanese Translation of PCT Application No. 2003-501303 (JP-A-2003-501303) describes a side airbag. The side airbag includes a cushion and an inflatable tube. The cushion has an inflatable upper chamber and an inflatable lower chamber that are partitioned by a separation panel. The inflatable tube is located adjacent to the cushion and is arranged adjacent to one of a bottom and rear side of the cushion so as to extend the range of at least part of the cushion before the cushion completely inflates by inflation gas.

However, the separation panel described in JP-A-2003-501303 is separately formed from the pieces of base fabric of the airbag, and the peripheral edge of the separation panel is sewed to the two pieces of airbag base fabric. Such work for sewing the separation panel is complicated, so there is room for improvement in terms of mass production of airbags.

In addition, in JP-A-2003-501303, the separation panel has vent holes, and gas is communicable between an upper chamber and a lower chamber through the vent holes. However, with the above structure, it is difficult to maintain airtightness between the upper chamber and the lower chamber, so it is presumably difficult to set an appropriate internal pressure for each chamber.

SUMMARY OF THE INVENTION

The invention provides a side airbag system and a method of manufacturing a side airbag, which make it possible to easily sew a side airbag having mutually partitioned upper bag portion and lower bag portion to improve mass productivity, while improving airtightness between the upper bag portion and the lower bag portion.

A first aspect of the invention provides a side airbag system. The side airbag system includes a side airbag. The side airbag includes: an upper bag portion that is formed of a piece of upper base fabric and that is located on a vehicle upper side; a lower bag portion that is formed of a piece of lower base fabric and that is located on a vehicle lower side of the upper bag portion; a tether portion that is formed of upper regions of the lower base fabric and that serves as a partition between the upper bag portion and the lower bag portion; and a tube that is formed of a piece of tube base fabric, that extends through the tether portion to the lower bag portion and to the upper bag portion, that has an opening at one end located adjacent to the lower bag portion and an opening at the other end located adjacent to the upper bag portion, and that distributes inflation gas between the upper bag portion and the lower bag portion. The side airbag is supplied with gas to inflate and deploy in the event of a side impact crash. A lower end portion of the upper base fabric is sewed to a bag outer surface at lower ends of the upper regions, used as the tether portion, in the lower base fabric. The tube is formed into a cylindrical shape in such a manner that the tube base fabric, sewed to the lower base fabric, is further sewed to the upper regions of the lower base fabric and folded toward a vehicle front side along a fold axis and then front ends of the folded tube base fabric are sewed together in a longitudinal direction of the tube. The tether portion is formed in such a manner that the upper regions of the lower base fabric folded along the fold axis are sewed together. The upper bag portion is formed in such a manner that an outer periphery of the upper base fabric and another outer periphery of the upper base fabric are sewed together, and the lower bag portion is formed in such a manner that an outer periphery of the lower base fabric and another outer periphery of the lower base fabric are sewed together.

In the side airbag system according to the above aspect, the tether portion that serves as a partition between the upper bag portion and the lower bag portion is formed of the upper regions of the lower base fabric, and is formed by sewing the upper regions of the lower base fabric folded along the fold axis. Thus, in comparison with the case where the base fabric and tether of the side airbag are separately formed from each other, work for sewing the side airbag having the upper bag portion and the lower bag portion is easy, and it is possible to improve mass productivity.

In addition, the tube that extends through the tether portion to the lower bag portion and to the upper bag portion and that distributes inflation gas between the upper bag portion and the lower bag portion is formed into a cylindrical shape in such a manner that the tube base fabric, sewed to the lower base fabric, is further sewed to the upper regions of the lower base fabric and is folded toward a vehicle front side along the fold axis and then the front ends are sewed together in the longitudinal direction of the tube, while the tether portion is formed in such a manner that the upper regions of the lower base fabric folded along the fold axis are sewed together. Thus, it is possible to improve airtightness between the upper bag portion and the lower bag portion.

In this way, with the side airbag system according to the above aspect, the side airbag having the upper bag portion and the lower bag portion partitioned from each other may be easily sewed to improve mass productivity, and it is possible to improve airtightness between the upper bag portion and the lower bag portion.

In the side airbag system according to the first aspect, the tube base fabric may be sewed to the upper region of the lower base fabric before a seam between the front ends of the folded tube base fabric so as to leave the seam to form a sewed portion, and the upper regions of the lower base fabric may be sewed to the sewed portion, terminating before the seam, between the tube base fabric and the upper regions of the lower base fabric.

With the side airbag system according to the above aspect, the tube base fabric is sewed to the upper regions of the lower base fabric before the seam between the front ends of the folded tube base fabric so as to leave the seam. Thus, after the tube base fabric is sewed to the upper regions of the lower base fabric, the front ends of the folded tube base fabric may be easily sewed together.

In addition, the upper regions of the lower base fabric are sewed to the sewed portion, terminating before the seam, between the tube base fabric and the upper regions. Thus, it is possible to improve airtightness between the upper bag portion and the lower bag portion.

In the side airbag system according to the first aspect, the upper bag portion may cover at least one of a chest and shoulder of an occupant seated on a vehicle seat, and the lower bag portion may cover a hip of the occupant.

With the side airbag system according to the above aspect, the upper bag portion covers at least one of the chest and shoulder of the occupant seated on the vehicle seat, and the lower bag portion covers the hip of the occupant. Thus, when the side airbag is supplied with gas to inflate and deploy in the event of a side impact crash, the upper bag portion is able to restrain at least one of the chest and shoulder of the occupant, and the lower bag portion is able to restrain the hip of the occupant.

The side airbag system according to the first aspect may further include an inflator that is arranged inside the tube, wherein the tube may be supplied with inflation gas from the inflator to inflate and deploy prior to the upper bag portion and the lower bag portion in the event of a side impact crash.

With the side airbag system according to the above aspect, the inflator is arranged inside the tube, and the tube is supplied with inflation gas from the inflator to inflate and deploy prior to the upper bag portion and the lower bag portion in the event of a side impact crash. Thus, in the event of a side impact crash, the occupant may be initially restrained by the tube.

In the side airbag system according to the first aspect, when the side airbag inflates and deploys, the one end of the tube, located adjacent to the lower bag portion, may open at a location corresponding to the hip of the occupant, and the other end of the tube, located adjacent to the upper bag portion, may open at a location corresponding to the shoulder of the occupant.

With the side airbag system according to the above aspect, when the side airbag inflates and deploys, one end of the tube opens at a location corresponding to the hip of the occupant, and the other end of the tube opens at a location corresponding to the shoulder of the occupant. Thus, in the event of a side impact crash, the hip and shoulder of the occupant may be quickly restrained.

In the side airbag system according to the first aspect, when the side airbag inflates and deploys, the one end of the tube, located adjacent to the lower bag portion, may open at a location corresponding to the hip of the occupant, and the other end of the tube, located adjacent to the upper bag portion, may extend toward a vehicle front side along the outer periphery of the upper bag portion and open at a location corresponding to the chest of the occupant.

With the side airbag system according to the above aspect, when the side airbag inflates and deploys, one end of the tube opens at a location corresponding to the hip of the occupant, and the other end of the tube extends toward a vehicle front side along the outer periphery of the upper bag portion and opens at a location corresponding to the chest of the occupant. Thus, in the event of a side impact crash, the hip and chest of the occupant may be quickly restrained.

In the side airbag system according to the first aspect, an opening area of the other end of the tube, located adjacent to the upper bag portion, may be smaller than an opening area of the one end of the tube, located adjacent to the lower bag portion.

With the side airbag system according to the above aspect, the opening area of the other end of the tube, which is located adjacent to the upper bag portion and which opens at a location corresponding to the chest of the occupant, is smaller than the opening area of one end of the tube, which is located adjacent to the lower bag portion and which opens at a location corresponding to the hip of the occupant. Thus, the amount of gas distributed to the upper bag portion may be controlled so as to be smaller than the amount of gas distributed to the lower bag portion. Thus, the chest of the occupant may be appropriately restrained by the upper bag portion.

In the side airbag system according to the first aspect, when the side airbag inflates and deploys, an internal pressure in the lower bag portion may be higher than an internal pressure in the upper bag portion.

With the side airbag system according to the above aspect, when the side airbag inflates and deploys, the internal pressure in the lower bag portion is higher than the internal pressure in the upper bag portion. Thus, the hip that relatively withstands a lateral load within the body of the occupant may be intensively restrained by the lower bag portion.

In the side airbag system according to the first aspect, the lower base fabric may be made of a material that is stronger than that of the upper base fabric.

The side airbag system according to the first aspect may further include an additional sewed portion provided for the upper bag portion, wherein the additional sewed portion extends from a vehicle front side end of the opening at the other end of the tube, located adjacent to the upper bag portion, toward a vehicle front side and terminates before a sewed portion at the outer periphery of the upper bag portion, wherein the upper bag portion may be partitioned by the additional sewed portion into an uppermost bag portion and an intermediate bag portion.

With the side airbag system according to the above aspect, the additional sewed portion is provided for the upper bag portion so as to extend from the vehicle front side end of the opening at the other end of the tube toward the vehicle front side and terminate before the sewed portion at the outer periphery of the upper bag portion, and the upper bag portion is partitioned by the additional sewed portion into the uppermost bag portion and the intermediate bag portion. Thus, the side airbag having three chambers may be easily sewed.

In the side airbag system according to the first aspect, the additional sewed portion may be set at a portion corresponding to an upper arm of the occupant.

With the side airbag system according to the above aspect, the additional sewed portion is set at a portion corresponding to the upper arm of the occupant. Thus, a press of the side airbag on the upper arm is suppressed in the event of a side impact crash. Hence, it is possible to suppress a lateral load applied to the chest via the upper arm.

In the side airbag system according to the first aspect, when the side airbag inflates and deploys, the lower bag portion may cover the hip of the occupant, the intermediate bag portion may cover the chest of the occupant, and the uppermost bag portion may cover the shoulder of the occupant.

With the side airbag system according to the above aspect, when the side airbag inflates and deploys, the lower bag portion covers the hip of the occupant, the intermediate bag portion covers the chest of the occupant, and the uppermost bag portion covers the shoulder of the occupant. Thus, it is possible to appropriately restrain the hip, chest and shoulder of the occupant in the event of a side impact crash.

In the side airbag system according to the first aspect, the intermediate bag portion may have a vent hole.

With the side airbag system according to the above aspect, the intermediate bag portion has the vent hole. Thus, when the intermediate bag portion restrains the chest of the occupant, gas in the intermediate bag portion is discharged through the vent hole. Hence, the internal pressure in the intermediate bag portion may be further decreased, and the restraining force of the intermediate bag portion may be decreased. In addition, gas flows into the intermediate bag portion last, so it is possible to reduce unnecessary discharge of gas through the vent hole at the initial stage of deployment of the side airbag.

In the side airbag system according to the first aspect, when the side airbag inflates and deploys, an internal pressure in the lower bag portion may be the highest and an internal pressure in the intermediate bag portion may be the lowest among the lower bag portion, the intermediate bag portion and the uppermost bag portion.

With the side airbag system according to the above aspect, when the side airbag inflates and deploys, the internal pressure in the lower bag portion is the highest and the internal pressure in the intermediate bag portion is the lowest among the lower bag portion, the intermediate bag portion and the uppermost bag portion. Thus, it is possible to obtain restraining force based on how much parts of the body withstand a lateral load.

In the side airbag system according to the first aspect, an inner surface of the lower base fabric may be treated with coating for improving airtightness, and an inner surface of the upper base fabric may not be treated with such coating.

With the side airbag system according to the above aspect, the inner surface of the lower base fabric is treated with coating for improving airtightness, while the inner surface of the upper base fabric is not treated with such coating. With the above simple configuration, when the side airbag inflates and deploys, a difference in internal pressure between the upper bag portion and the lower bag portion may be maintained over a further long period of time.

A second aspect of the invention provides a method of manufacturing a side airbag. The method includes: a first step of sewing a piece of tube base fabric to a bag inner surface of a piece of lower base fabric; a second step of sewing a lower end portion of a piece of upper base fabric to a bag outer surface at lower ends of upper regions, used as a tether portion, in the lower base fabric; a third step of sewing the tube base fabric to bag inner sides of the upper regions in the lower base fabric; a fourth step of folding the tube base fabric toward a vehicle front side along a fold axis and then sewing front ends of the folded tube base fabric together to form a cylindrical tube; a fifth step of folding the lower base fabric along the fold axis and then sewing the upper regions of the lower base fabric together to form the tether portion; and a sixth step of sewing an outer periphery of the lower base fabric and another outer periphery of the lower base fabric together to form a lower bag portion and sewing an outer periphery of the upper base fabric and another outer periphery of the upper base fabric together to form an upper bag portion. The tether portion serves as a partition between the upper bag portion and the lower bag portion, and the tube extends through the tether portion to the lower bag portion and to the upper bag portion.

With the method of manufacturing a side airbag according to the above aspect, the upper regions of the lower base fabric are used as the tether portion, so, in comparison with the case where the base fabric of the side airbag is separately formed from the tether, work for sewing the side airbag having the upper bag portion and the lower bag portion is easy, and it is possible to improve mass productivity.

In addition, in the third step, the tube base fabric is sewed to the bag inner sides of the upper regions in the lower base fabric. In the fourth step, the tube base fabric is folded toward the vehicle front side along the fold axis and then the front end portions of the folded tube base fabric are sewed together to form the cylindrical tube. In the fifth step, the lower base fabric is folded along the fold axis, and the upper regions are sewed together to form the tether portion. Thus, it is possible to improve airtightness between the upper bag portion and the lower bag portion.

In the method of manufacturing a side airbag according to the second aspect, the tube base fabric may be sewed to the upper regions of the lower base fabric in the third step before a seam between the front ends of the folded tube base fabric so as to leave the seam to form a sewed portion, and the upper regions of the lower base fabric may be sewed together to the sewed portion, terminating before the seam, between the tube base fabric and the upper regions of the lower base fabric.

With the method of manufacturing a side airbag according to the above aspect, the tube base fabric is sewed to the upper regions of the lower base fabric in the third step before the seam between the front ends of the tube base fabric so as to leave the seam. Thus, after the tube base fabric is sewed to the upper regions of the lower base fabric, the front ends of the folded tube base fabric may be easily sewed together.

In addition, the upper regions of the lower base fabric are sewed together to the sewed portion, terminating before the seam, between the tube base fabric and the upper region. Thus, it is possible to improve airtightness between the upper bag portion and the lower bag portion.

The method of manufacturing a side airbag according to the second aspect may further include a seventh step of providing an additional sewed portion for the upper bag portion so as to extend from a vehicle front side end of an opening at an end of the tube, located adjacent to the upper bag portion, toward a vehicle front side and terminate before a sewed portion at the outer periphery of the upper bag portion, wherein the additional sewed portion may partition the upper bag portion into an uppermost bag portion and an intermediate bag portion.

With the side airbag according to the above aspect, in the seventh step, the additional sewed portion is provided so as to extend from the vehicle front side end of the opening at the other end of the tube toward the vehicle front side and terminate before the sewed portion at the outer periphery of the upper bag portion, and the additional sewed portion partitions the upper bag portion into the uppermost bag portion and the intermediate bag portion. Thus, it is possible to easily sew the side airbag having three chambers.

In the method of manufacturing a side airbag according to the second aspect, the first step to the third step may be processed in selected order, and the fourth step to the sixth step may be processed in order of step numbers.

As described above, with the side airbag system according to the aspect of the invention, the following advantageous effect may be obtained. The side airbag having the upper bag portion and the lower bag portion partitioned from each other may be easily sewed to improve mass productivity, and it is possible to improve airtightness between the upper bag portion and the lower bag portion.

In addition, with the side airbag system according to the aspect of the invention, the following advantageous effect may be obtained. After the tube base fabric is sewed to the upper regions of the lower base fabric, the front ends of the folded tube base fabric may be easily sewed together, and it is possible to improve airtightness between the upper bag portion and the lower bag portion.

In addition, with the side airbag system according to the aspect of the invention, the following advantageous effect may be obtained. When the side airbag is supplied with gas to inflate and deploy, the upper bag portion is able to restrain at least one of the chest and shoulder of the occupant, and the lower bag portion is able to restrain the hip of the occupant.

In addition, with the side airbag system according to the aspect of the invention, the following advantageous effect may be obtained. In the event of a side impact crash, the occupant may be initially restrained by the tube.

In addition, with the side airbag system according to the aspect of the invention, the following advantageous effect may be obtained. The hip and shoulder of the occupant may be quickly restrained.

In addition, with the side airbag system according to the aspect of the invention, the following advantageous effect may be obtained. In the event of a side impact crash, the hip and chest of the occupant may be quickly restrained.

In addition, with the side airbag system according to the aspect of the invention, the following advantageous effect may be obtained. The chest of the occupant may be appropriately restrained by the upper bag portion.

In addition, with the side airbag system according to the aspect of the invention, the following advantageous effect may be obtained. The hip that relatively withstands a lateral load within the body of the occupant may be intensively restrained by the lower bag portion.

In addition, with the side airbag system according to the aspect of the invention, the following advantageous effect may be obtained. The side airbag having three chambers may be easily sewed.

In addition, with the side airbag system according to the aspect of the invention, the following advantageous effect may be obtained. It is possible to suppress a lateral load applied to the chest via the upper arm.

In addition, with the side airbag system according to the aspect of the invention, the following advantageous effect may be obtained. It is possible to appropriately restrain the hip, chest and shoulder of the occupant in the event of a side impact crash.

In addition, with the side airbag system according to the aspect of the invention, the following advantageous effect may be obtained. The internal pressure in the intermediate bag portion may be further decreased, and the restraining force of the intermediate bag portion may be decreased.

In addition, with the side airbag system according to the aspect of the invention, the following advantageous effect may be obtained. It is possible to obtain restraining force based on resistance how much parts of the body withstand a lateral load.

In addition, with the side airbag system according to the aspect of the invention, the following advantageous effect may be obtained. When the side airbag inflates and deploys, a difference in internal pressure between the upper bag portion and the lower bag portion may be maintained over a further long period of time.

In addition, as described above, with the method of manufacturing a side airbag according to the aspect of the invention, the following advantageous effect may be obtained. The side airbag having the upper bag portion and the lower bag portion partitioned from each other may be easily sewed to improve mass productivity, and it is possible to improve airtightness between the upper bag portion and the lower bag portion.

In addition, with the method of manufacturing a side airbag according to the aspect of the invention, the following advantageous effect may be obtained. After the tube base fabric is sewed to the upper regions of the lower base fabric, the front ends of the folded tube base fabric may be easily sewed together, and it is possible to improve airtightness between the upper bag portion and the lower bag portion.

In addition, with the method of manufacturing a side airbag according to the aspect of the invention, the following advantageous effect may be obtained. The side airbag having three chambers may be easily sewed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 12 is an enlarged perspective view that shows a state where the upper regions of the lower base fabric are sewed together to form the tether portion according to the first embodiment of the invention;

DETAILED DESCRIPTION OF EMBODIMENTS

Hereinafter, embodiments of the invention will be described with reference to the accompanying drawings.

Figure 1:
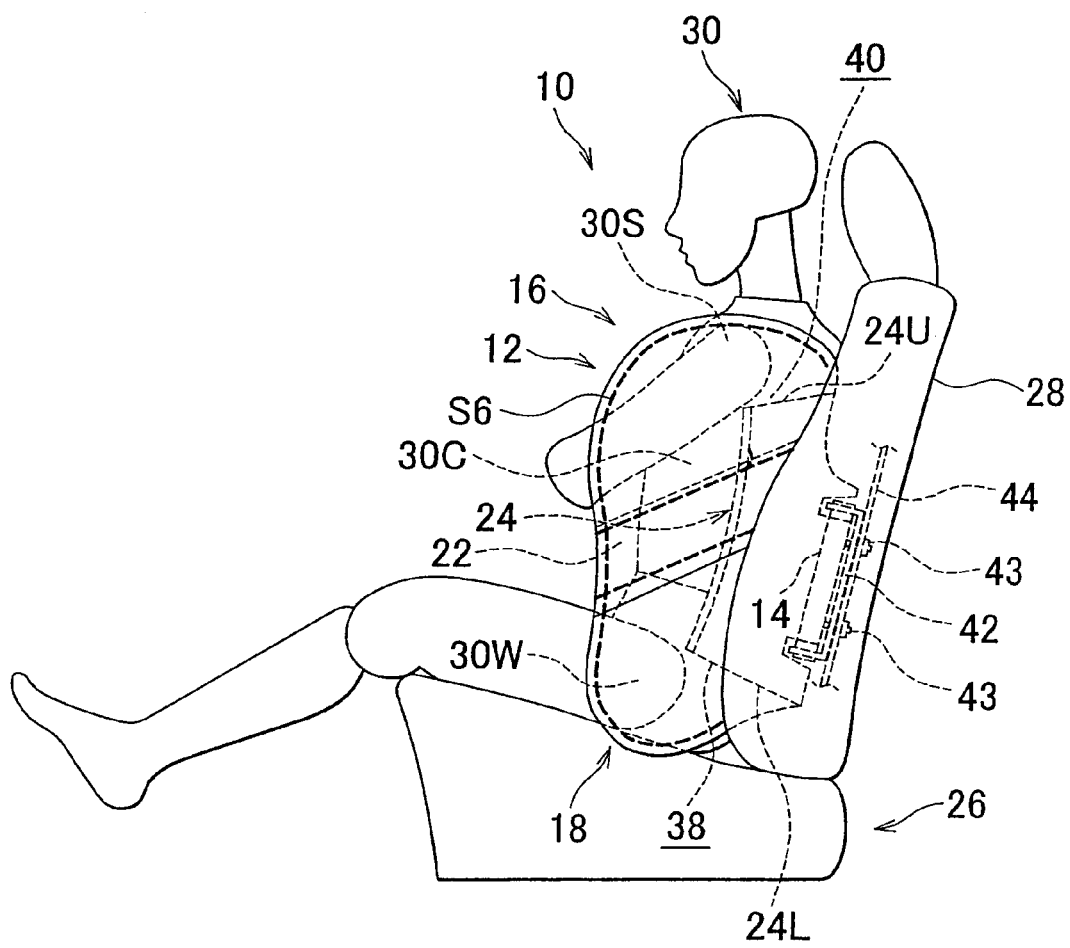
FIG. 1 is a side view that shows a state where a side airbag is inflated and deployed to a lateral side of an occupant seated on a vehicle seat according to a first embodiment of the invention.

First, a side airbag system according to a first embodiment of the invention will be described. As shown in FIG. 1, the side airbag system 10 according to the first embodiment of the invention includes a side airbag 12 and an inflator 14.

Figure 2:
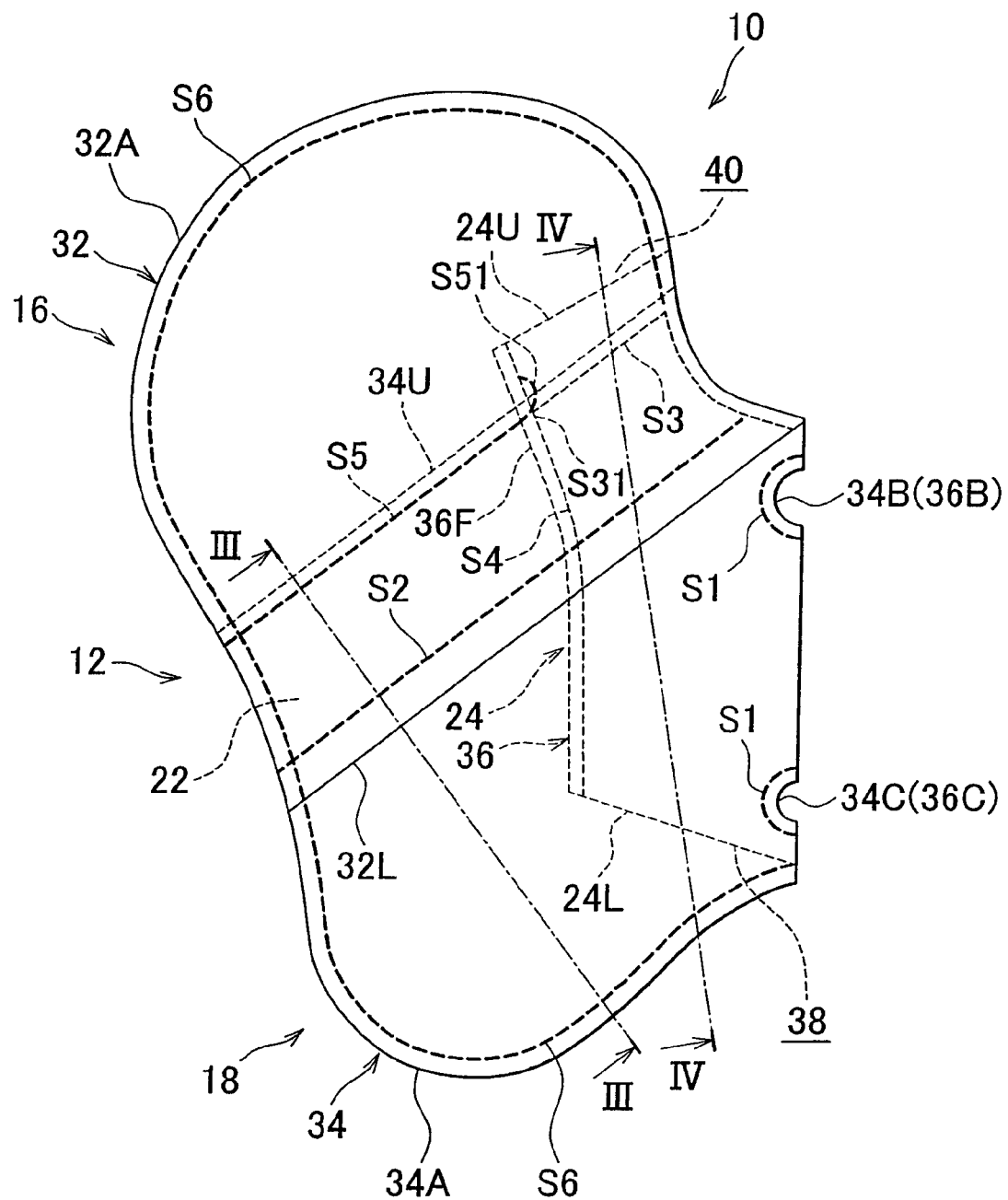
FIG. 2 is a side view that shows the side airbag according to the first embodiment of the invention.

As shown in FIG. 2, the side airbag 12 has an upper bag portion 16, a lower bag portion 18, a tether portion 22 and a tube 24. As shown in FIG. 1, the side airbag 12 is, for example, folded and accommodated in the side portion of a seat back 28 in a vehicle seat 26 during normal times. In the event of a side impact crash, the side airbag 12 is supplied with gas from the inflator 14 to inflate and deploy to the lateral side of an occupant 30 seated on the vehicle seat 26. Note that FIG. 1 shows a dummy as the occupant 30.

The upper bag portion 16 is formed of pieces of upper base fabric 32, and is an inflatable portion located on a vehicle upper side. The upper bag portion 16 covers at least one of the chest 30C and shoulder 30S of the occupant 30 seated on the vehicle seat 26. In the present embodiment, the upper bag portion 16 covers both the chest 30C and shoulder 30S of the occupant 30. In addition, the lower bag portion 18 is formed of a piece of lower base fabric 34, and is an inflatable portion located on a vehicle lower side of the upper bag portion 16. The lower bag portion 18 covers the hip 30W of the occupant 30 seated on the vehicle seat 26. The inner surface of the lower base fabric 34 is treated with coating for improving airtightness, while the inner surfaces of the pieces of upper base fabric 32 are not treated with such coating.

Figure 3:
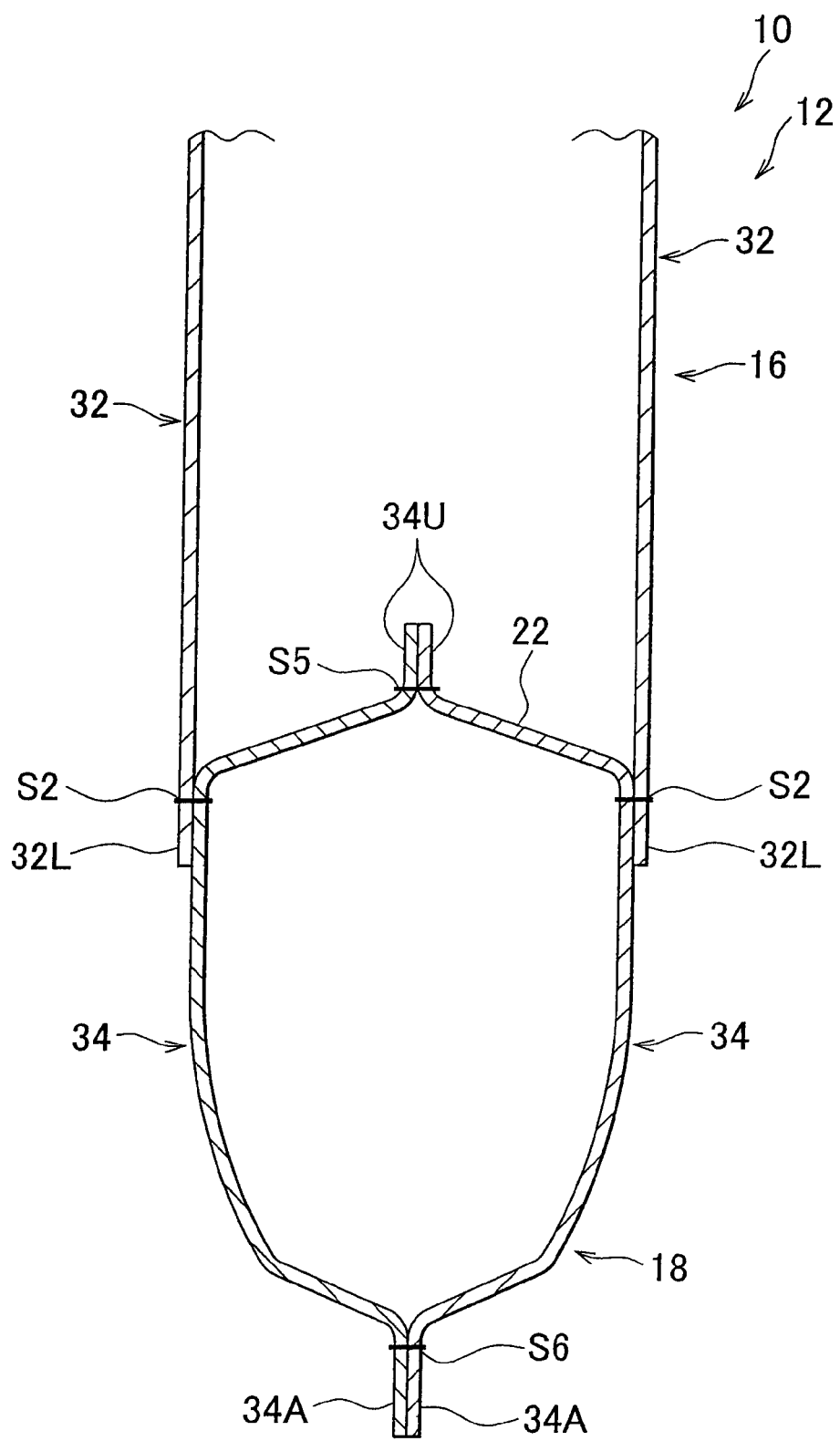
FIG. 3 is an enlarged cross-sectional view that is taken along the line III-III in FIG. 2, showing the side airbag according to the first embodiment of the invention.
Figure 4:
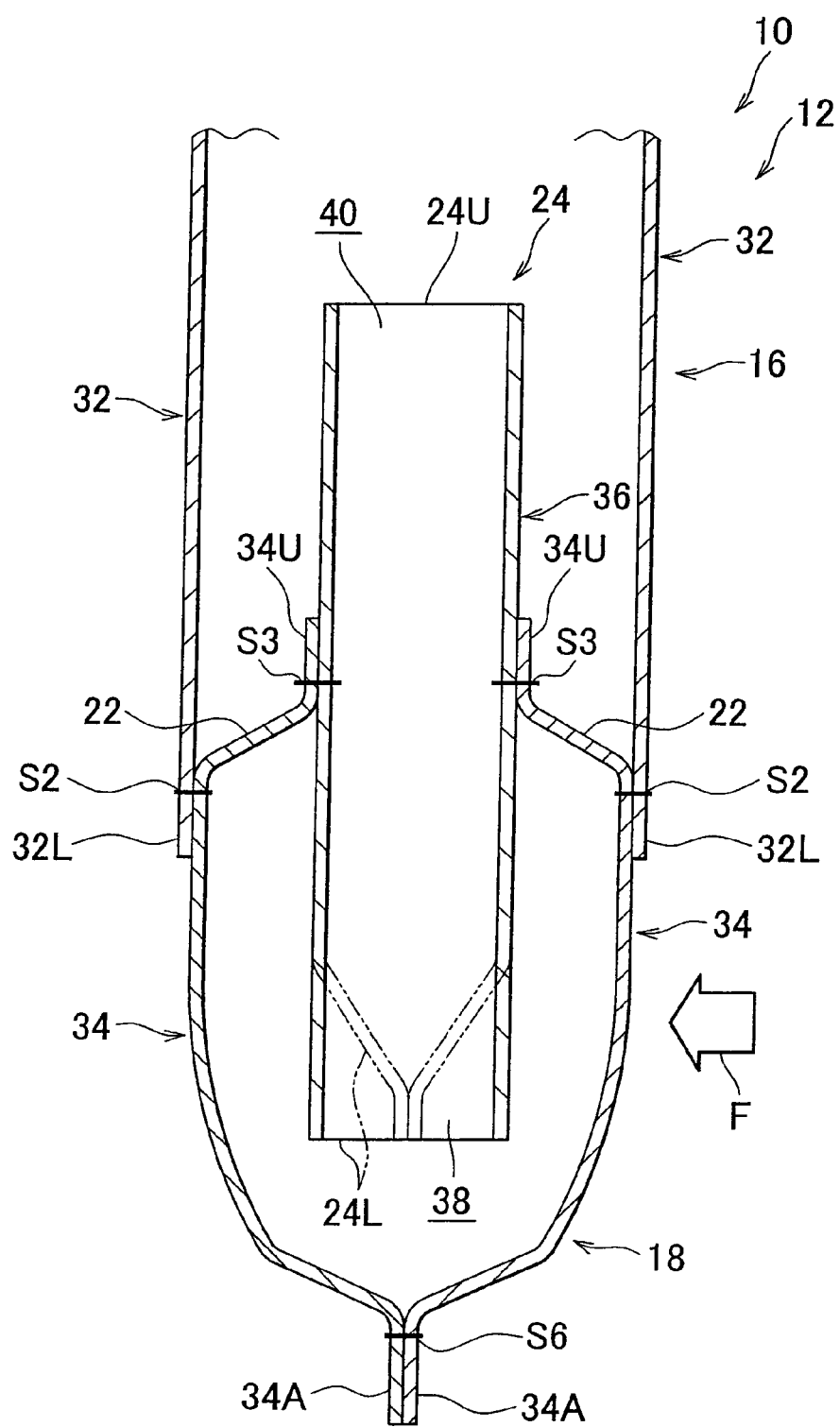
FIG. 4 is an enlarged cross-sectional view that is taken along the line IV-IV in FIG. 2, showing the side airbag according to the first embodiment of the invention.
Figure 7:
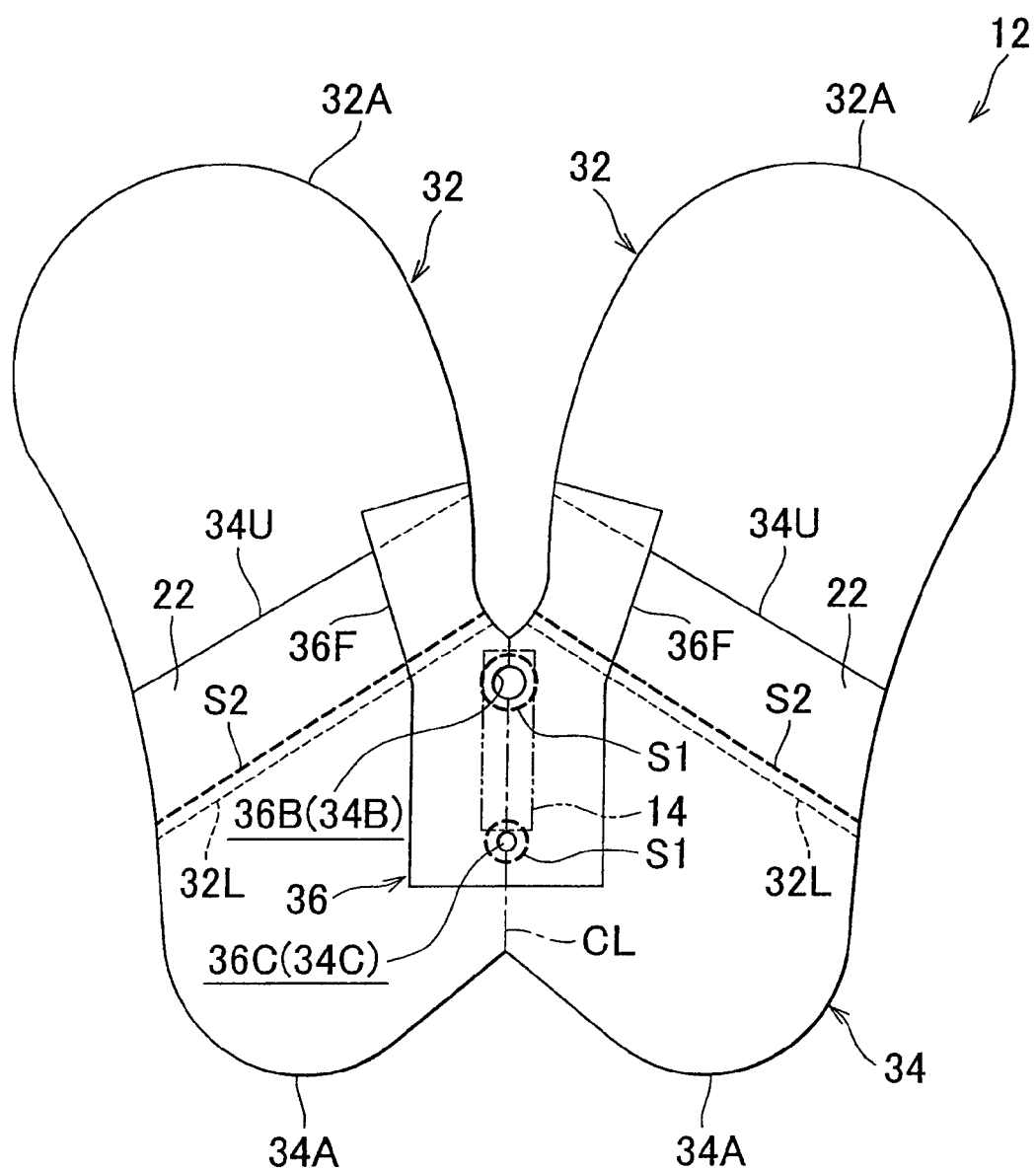
FIG. 7 is an expansion plan that shows that, in a second step according to the first embodiment of the invention, lower ends of pieces of upper base fabric are sewed to a bag outer surface at lower ends of upper regions, used as a tether portion, in the lower base fabric.

As shown in FIGS. 3, 4 and 7, the lower end portion 32L of each piece of upper base fabric 32 is sewed to the bag outer surface of the lower base fabric 34 at the lower end (sewed portion S2) of a corresponding one of the upper regions 34U used as the tether portion 22. The lower base fabric 34 has a foldable shape, that is, a line-symmetrical shape, along a fold axis CL. The upper regions 34U are bifurcated, and the pieces of upper base fabric 32 are sewed to the respective upper regions 34U one by one. In the expansion plan shown in FIG. 7, the pieces of upper base fabric 32 are line-symmetrical with respect to the fold axis CL.

Figure 14:
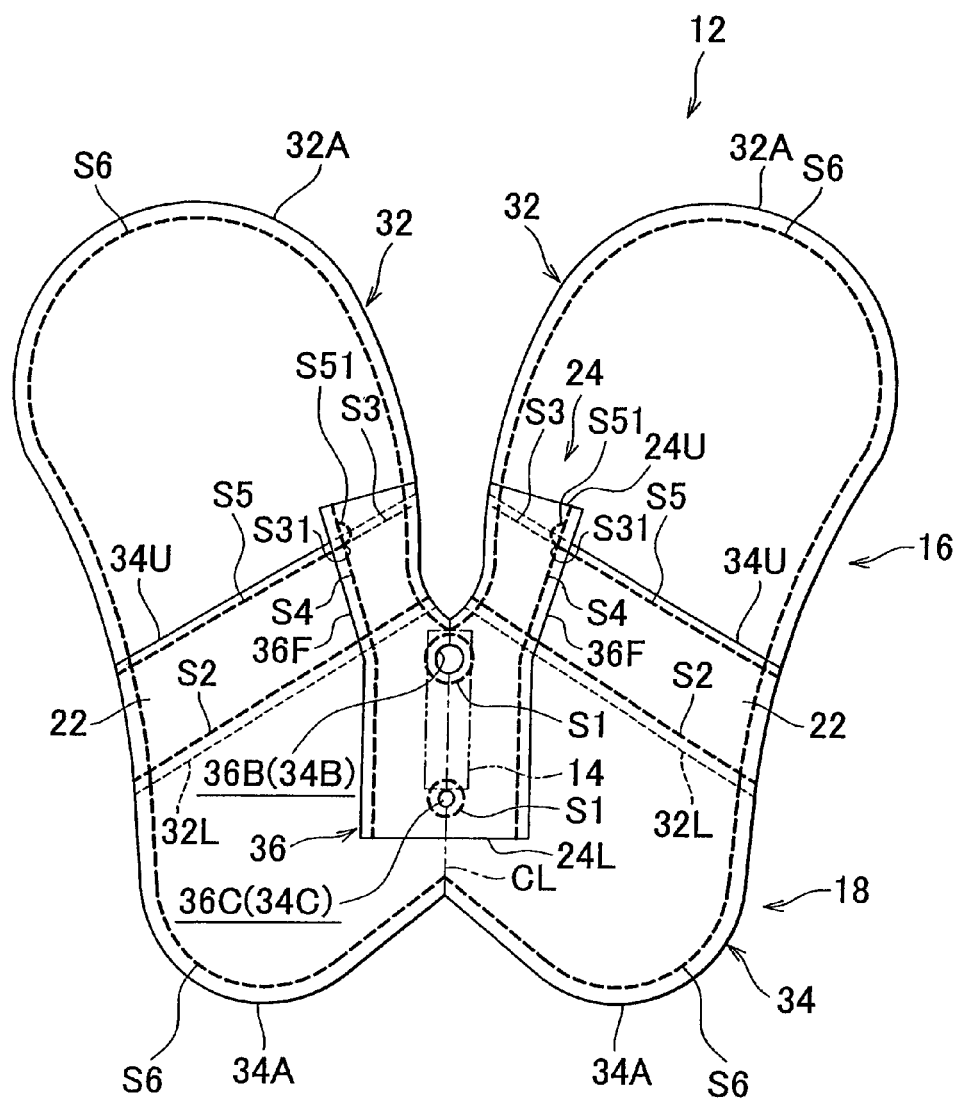
FIG. 14 is an expansion plan that shows that, in a sixth step according to the first embodiment of the invention, an outer periphery of the lower base fabric and another outer periphery of the lower base fabric are sewed together to form the lower bag portion and an outer periphery of the upper base fabric and another outer periphery of the upper base fabric are sewed together to form the upper bag portion.

The upper bag portion 16 is formed so that the outer peripheries 32A of the pieces of upper base fabric 32 are sewed together, and the lower bag portion 18 is formed so that the outer peripheries 34A of the lower base fabric 34 are sewed together (sewed portion S6). Specifically, as shown in FIG. 14, the lower bag portion 18 is formed so that the outer peripheries 34A of the lower base fabric 34 folded along the fold axis CL are sewed together. In addition, the upper bag portion 16 is formed so that the outer peripheries 32A of the folded pieces of upper base fabric 32 folded along the fold axis CL together with the lower bag portion 18 are sewed together.

As shown in FIG. 2 to FIG. 4, the tether portion 22 is formed of the upper regions 34U of the lower base fabric 34. The tether portion 22 serves as a partition between the upper bag portion 16 and the lower bag portion 18. The tether portion 22 is formed in such a manner that the upper regions 34U of the lower base fabric 34 folded along the fold axis CL are sewed together. In addition, the tether portion 22 is inclined toward a vehicle lower side as it extends from the rear end of the side airbag 12 toward the vehicle front side.

As shown in FIG. 2 and FIG. 4, the tube 24 is formed of a piece of tube base fabric 36, and extends through the tether portion 22 to the lower bag portion 18 and to the upper bag portion 16. Openings 38 and 40 are respectively provided at one end 24L located adjacent to the lower bag portion 18 and the other end 24U located adjacent to the upper bag portion 16 to distribute inflation gas between the upper bag portion 16 and the lower bag portion 18.

Figure 8:
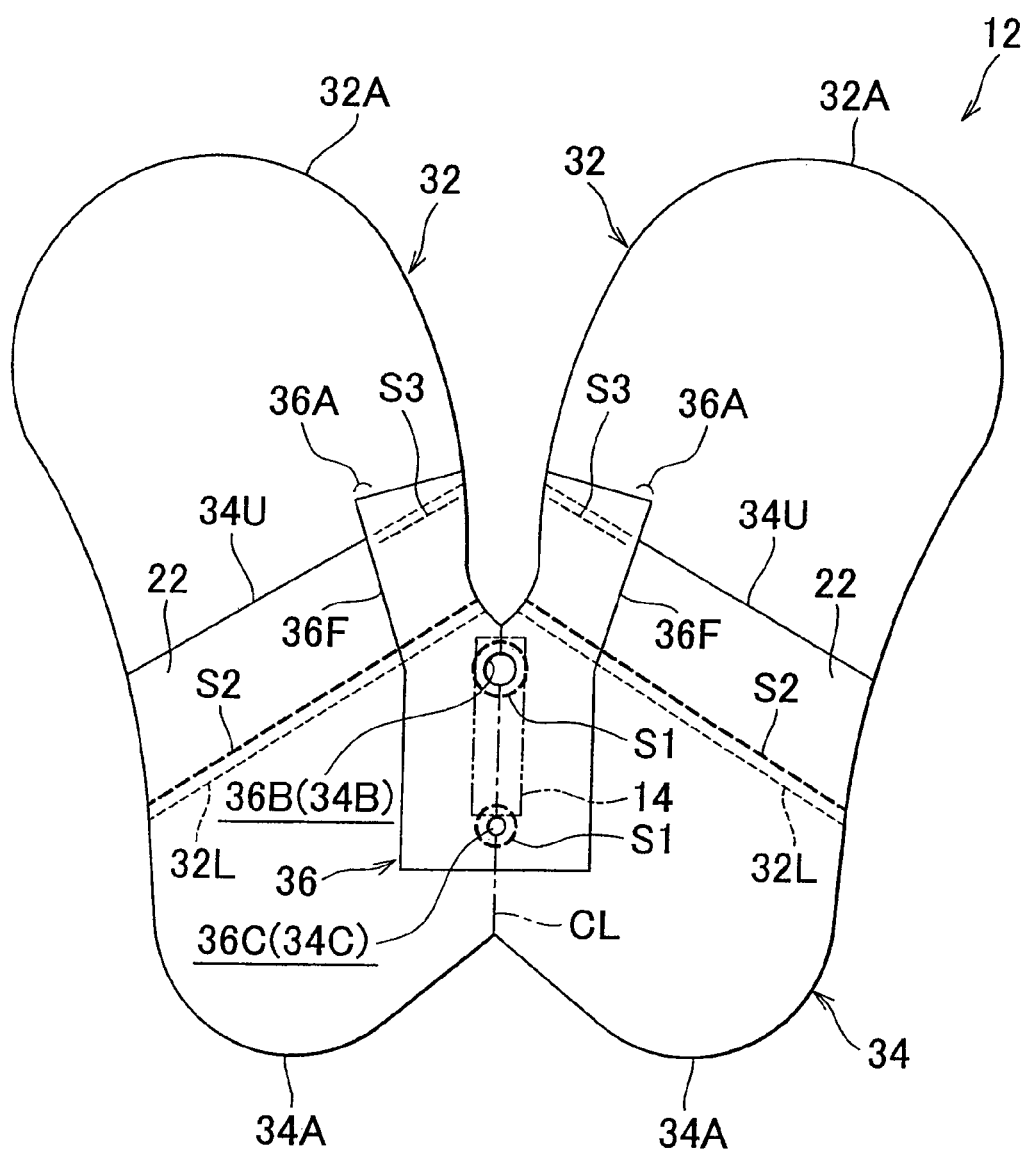
FIG. 8 is an expansion plan that shows that, in a third step according to the first embodiment of the invention, the tube base fabric is sewed to bag inner sides of the upper regions of the lower base fabric.
Figure 9:
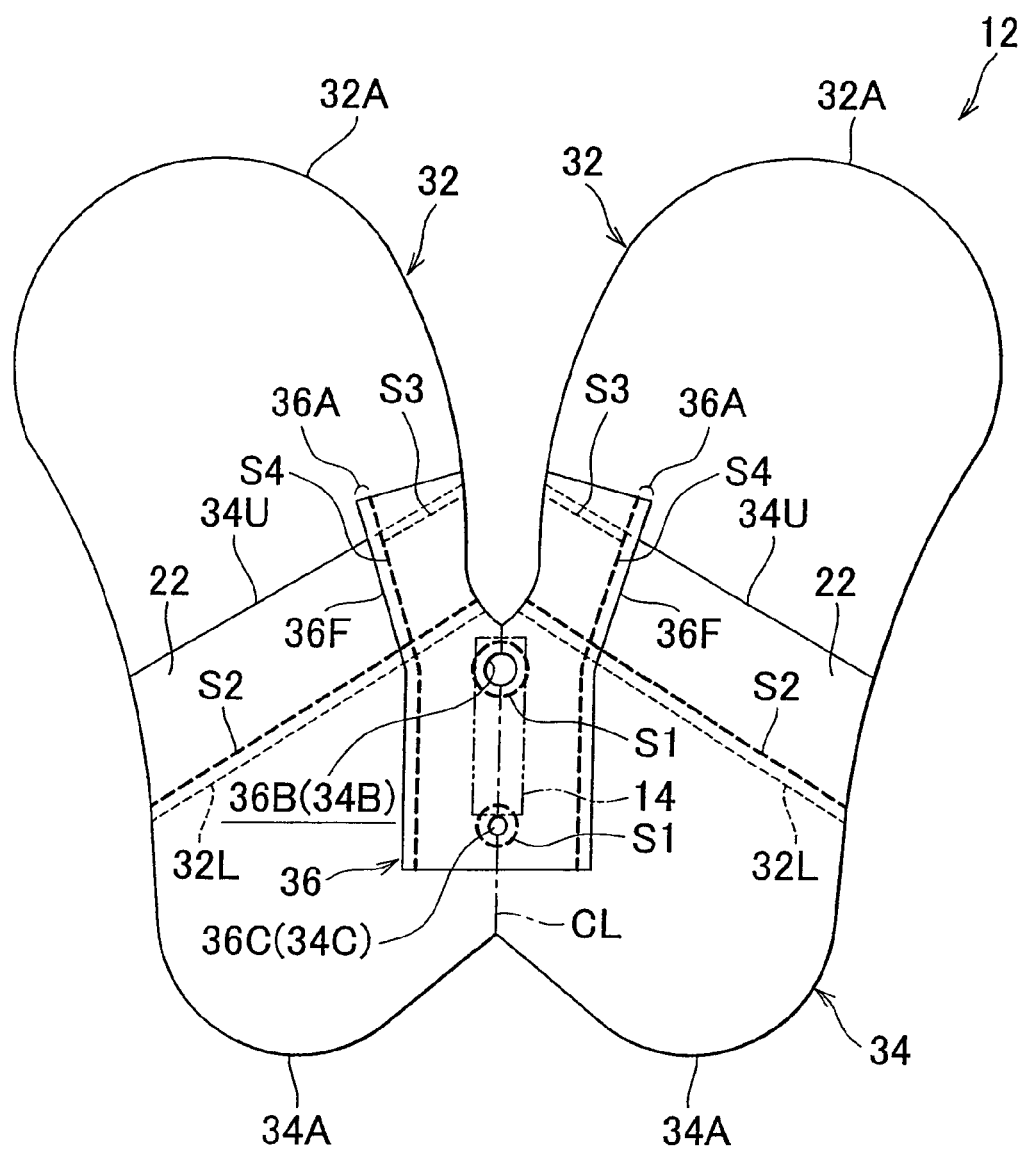
FIG. 9 is an expansion plan that shows that, in a fourth step according to the first embodiment of the invention, the tube base fabric is folded toward a vehicle front side along a fold axis and then the front ends of the folded tube base fabric are sewed together to form a cylindrical tube.
Figure 10:
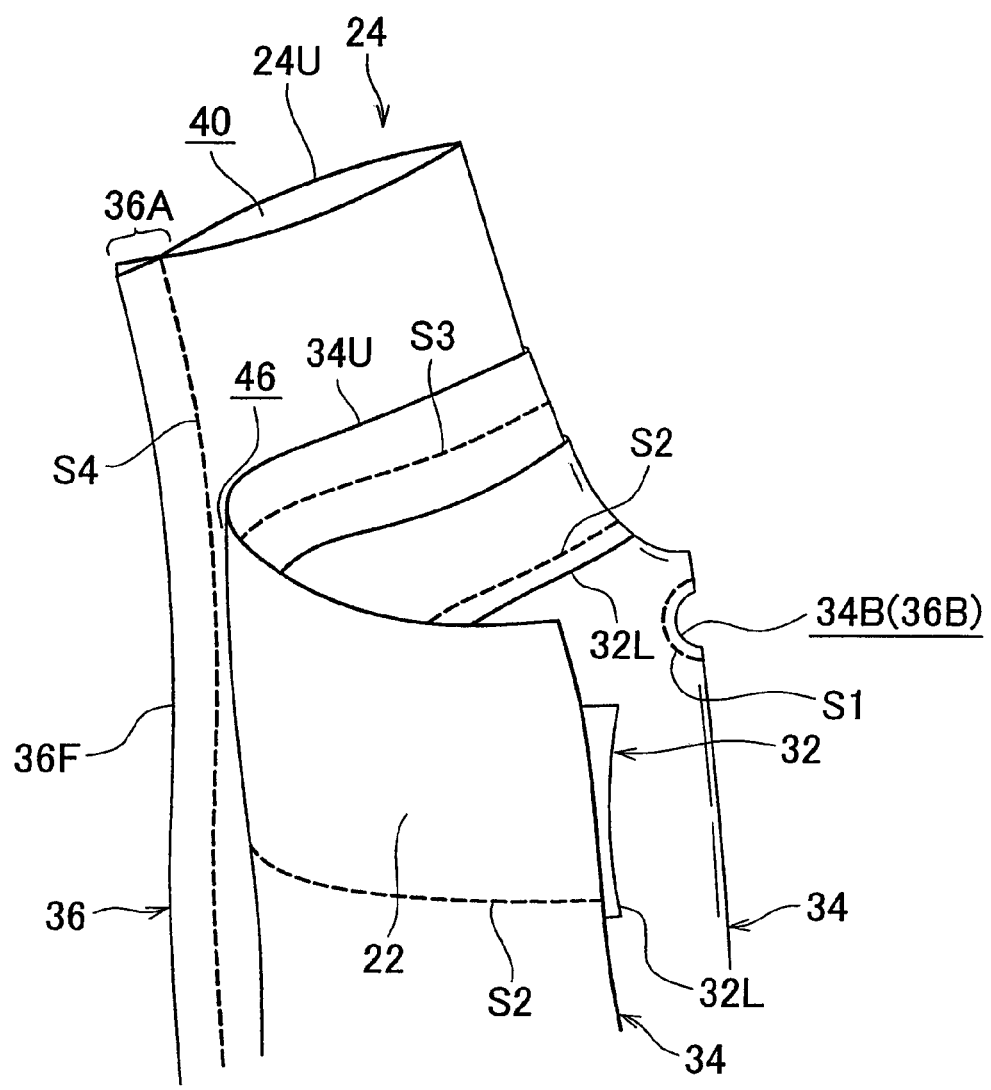
FIG. 10 is an enlarged perspective view that shows a state where the front ends of the folded tube base fabric are sewed together to form the cylindrical tube according to the first embodiment of the invention.

The tube 24 is formed into a cylindrical shape in such a manner that the tube base fabric 36 sewed to the lower base fabric 34 is further sewed to the upper regions 34U of the lower base fabric 34 as shown in FIG. 8, and is folded toward the vehicle front side along the fold axis CL and then, as shown in FIG. 9 and FIG. 10, the front ends 36F of the folded tube base fabric 36 are sewed together in the longitudinal direction of the tube 24 (sewed portion S4).

Figure 5:
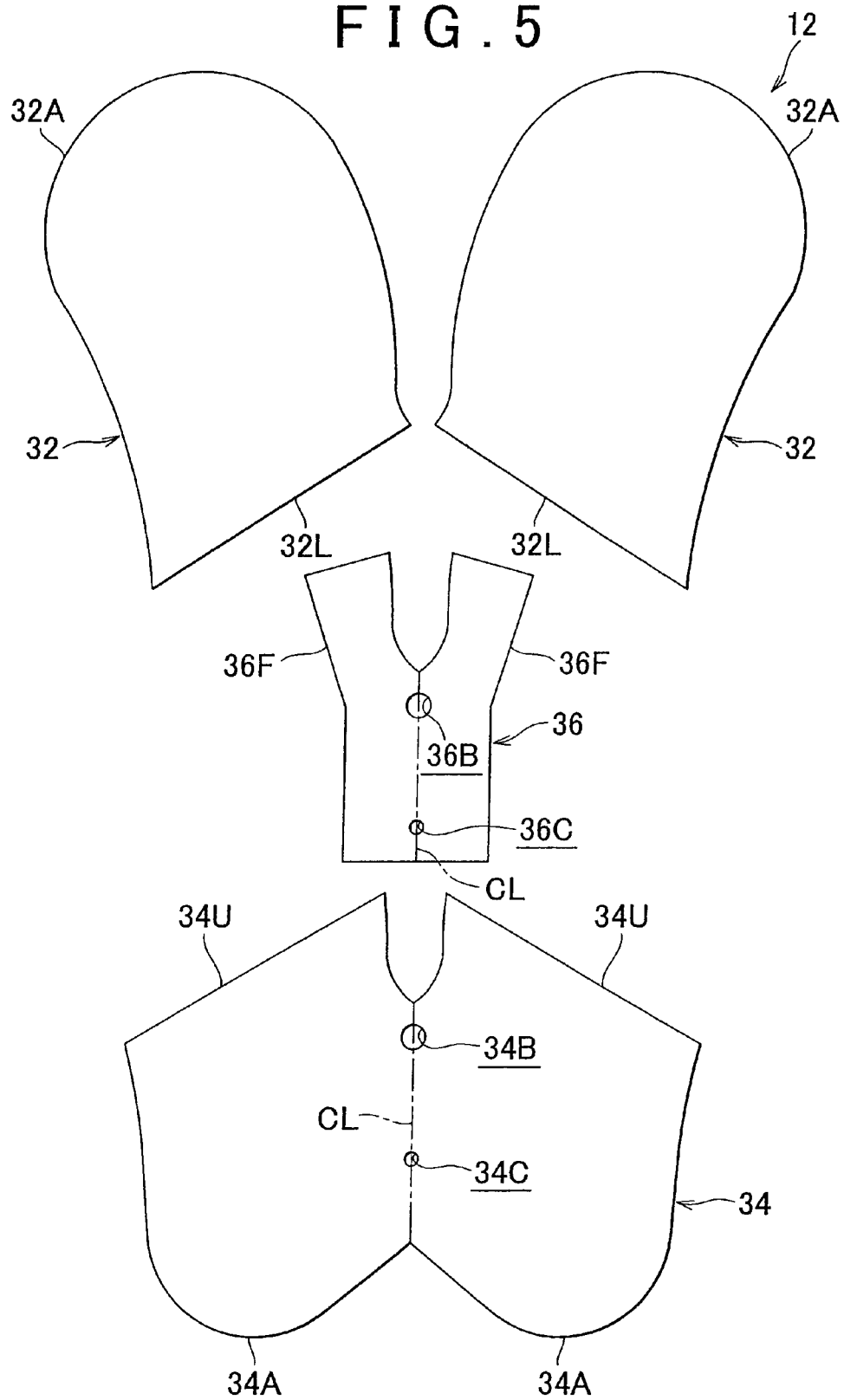
FIG. 5 is an expansion plan that shows each base fabric of the side airbag before being sewed together according to the first embodiment of the invention.
Figure 6:
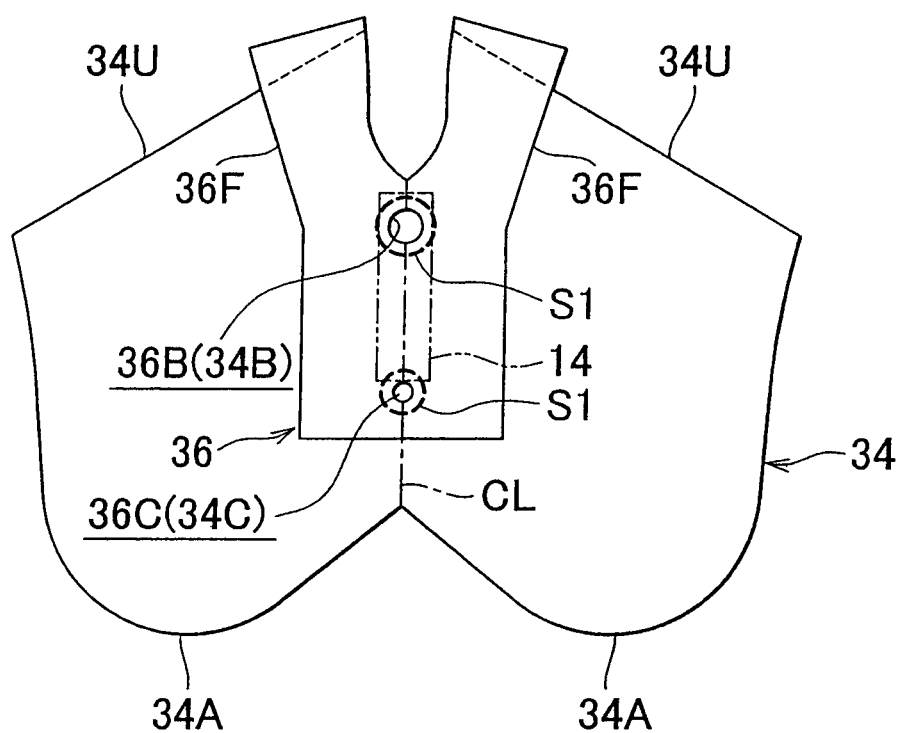
FIG. 6 is an expansion plan that shows that, in a first step according to the first embodiment of the invention, a tube base fabric is sewed to a bag inner surface of a lower base fabric.

As shown in FIG. 5 and FIG. 6, the upper portion of the tube base fabric 36 is bifurcated in correspondence with the upper regions 34U of the lower base fabric 34. Through holes 36B and 36C are formed in the tube base fabric 36, for example, on the fold axis CL. Through holes 34B and 34C are formed in the lower base fabric 34, for example, on the fold axis CL. The through holes 34B and 36B located on the vehicle upper side are respectively larger than the through holes 34C and 36C located on the vehicle lower side. This is to make it easy to insert the inflator 14 from the upper-side through holes 34B and 36B into the tube 24.

When the tube base fabric 36 is sewed to the lower base fabric 34, the through hole 36B of the tube base fabric 36 corresponds to the through hole 34B of the lower base fabric 34, and the through hole 36C of the tube base fabric 36 corresponds to the through hole 34C of the lower base fabric 34. Then, as shown in FIG. 6, the tube base fabric 36 is attached to the lower base fabric 34 in such a manner that the peripheral portions of the through holes 34B and 36B are respectively sewed to the peripheral portions of the through holes 34C and 36C (sewed portions S1).

Note that the positions of the through holes 34B and 34C in the lower base fabric 34 and the positions of the through holes 36B and 36C in the tube base fabric 36 are not limited to positions on the fold axis CL; instead, the positions may be offset from the fold axis CL in FIG. 5. In other words, as shown in FIG. 2, the through holes 34B, 34C, 36B and 36C may be located at the side portion of the side airbag 12.

As shown in FIG. 1, for example, the cylindrical inflator 14 is arranged inside the tube 24. The inflator 14 is, for example, inserted from the vehicle upper side through hole 34B of the lower base fabric 34 (vehicle upper side through hole 36B of the tube base fabric 36) into the tube 24, and the upper and lower ends of the inflator 14 are held by a mounting bracket 42 arranged outside the side airbag 12. The upper and lower ends of the inflator 14 are coupled to the mounting bracket 42 through the vehicle upper side through hole 34B of the lower base fabric 34 (vehicle upper side through hole 36B of the tube base fabric 36) and the vehicle lower side through hole 34C of the lower base fabric 34 (vehicle lower side through hole 36C of the tube base fabric 36). Two upper and lower stud bolts 43 are, for example, provided for the mounting bracket 42. The mounting bracket 42 is fixed to a seat back frame 44 in the seat back 28 using the stud bolts 43.

Note that it is also applicable that the mounting bracket 42 is not used, stud bolts are provided upright on the inflator 14 or a diffuser (not shown) and then the stud bolts are extended through the tube base fabric 36 and the lower base fabric 34 to be fixedly fastened to the seat back frame 44. In this case, the vehicle lower side through holes 34C and 36C that do not serve as insertion holes of the inflator 14 may be appropriately omitted.

The inflator 14 is arranged in the tube 24. When the inflator 14 is activated in the event of a side impact crash, inflation gas is initially supplied to the tube 24. Owing to the supplied gas, the tube 24 inflates and deploys prior to the upper bag portion 16 and the lower bag portion 18.

Although not shown in the drawing, the inflator 14 is connected to an airbag ECU via a wire harness, and is activated by activating electric current from the airbag ECU to supply inflation gas to the side airbag 12. The airbag ECU supplies activating electric current to the inflator 14 when the airbag ECU determines occurrence of a side impact crash on the basis of a signal from a crash sensor (not shown).

As shown in FIG. 2, the opening area of the other end 24U (adjacent to the upper bag portion 16) of the tube 24 with respect to the volume of the upper bag portion 16 is smaller than the opening area of one end 24L (adjacent to the lower bag portion 18) of the tube 24 with respect to the volume of the lower bag portion 18. This is to increase the internal pressure in the lower bag portion 18 by supplying larger amount of gas to the lower bag portion 18 to increase restraining force of the lower bag portion 18 applied to the hip 30W of the occupant 30, while decreasing the internal pressure in the upper bag portion 16 to decrease restraining force of the upper bag portion 16 applied to the shoulder 30S and chest 30C of the occupant 30.

As shown in FIG. 8 to FIG. 10, the tube base fabric 36 is sewed to the upper regions 34U of the lower base fabric 34 before a seam 36A between front ends 36F of the folded tube base fabric 36 so as to leave the seam 36A (sewed portion S3).

Figure 11:
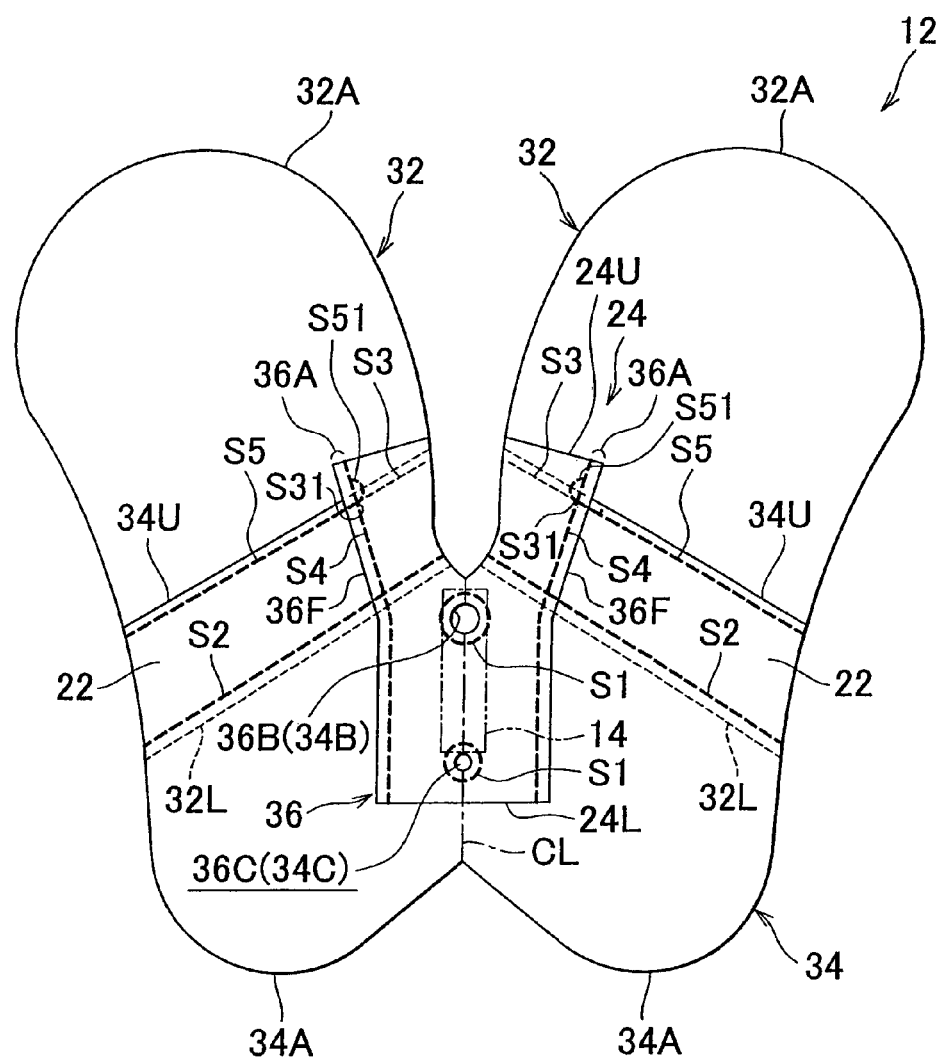
FIG. 11 is an expansion plan that shows that, in a fifth step according to the first embodiment of the invention, the lower base fabric is folded along the fold axis and the upper regions are sewed together to form the tether portion.
Figure 13A:
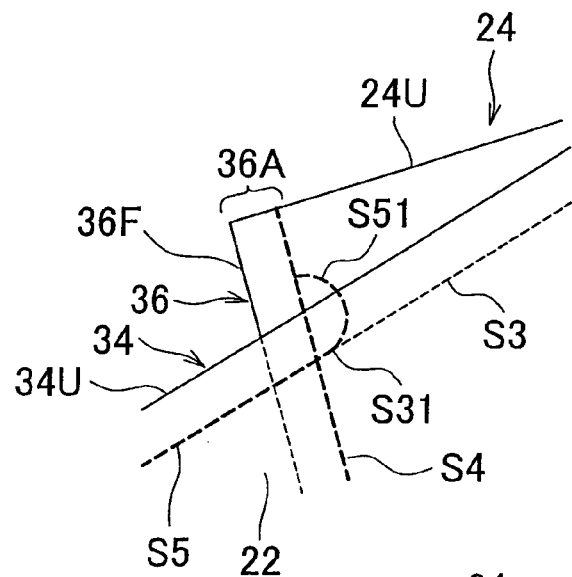
FIG. 13A is an enlarged side view that shows a state where a rear end of a sewed portion at which the upper regions of the lower base fabric according to the first embodiment of the invention are sewed together is formed so as to bend toward a vehicle upper side.

In addition, as shown in FIG. 11 and FIG. 12, the upper regions 34U of the lower base fabric 34 are sewed together to the sewed portion S3, terminating before the seam 36A, between the tube base fabric 36 and the upper regions 34U (sewed portion S5). Specifically, as shown in FIG. 12 and FIG. 13A, the sewed portion S5 extends from the vehicle front sides of the upper regions 34U of the lower base fabric 34 to the vehicle rear side, and a rear end portion S51, for example, reaches the front end S31 of the sewed portion S3, curves toward the vehicle upper side and then terminates near the sewed portion S4.

Figure 13B:
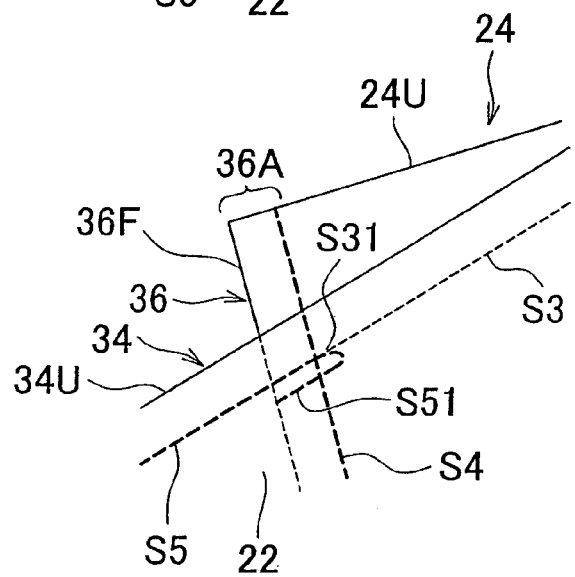
FIG. 13B is an enlarged side view that shows a state where the rear end of the sewed portion at which the upper regions of the lower base fabric according to the first embodiment of the invention are sewed together is formed to be folded back toward the vehicle front side.
Figure 13C:
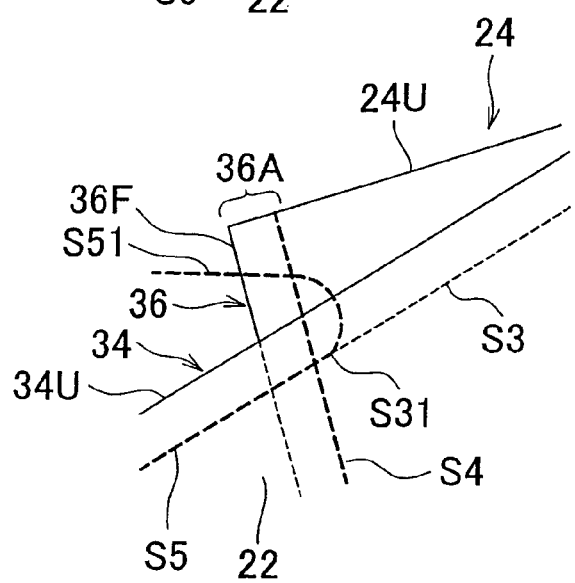
FIG. 13C is an enlarged side view that shows a state where the rear end of the sewed portion at which the upper regions of the lower base fabric according to the first embodiment of the invention are formed so as to bend toward the vehicle upper side and are extended beyond the front ends of the folded tube base fabric into the upper base fabric side to terminate.

Note that the shape of the rear end portion S51 of the sewed portion S5 is not limited to the above curved shape. For example, as shown in FIG. 13B, the sewed portion S5 may reach the front end of the sewed portion S3, fold back toward, for example, the vehicle front side and then terminates near the front ends 36F of the folded tube base fabric 36. Alternatively, as shown in FIG. 13C, the sewed portion S5 may extend beyond the front ends 36F of the tube base fabric 36 into the upper base fabric 32 side to terminate.

In the examples shown in the drawings, the upper portion of the tube 24 protrudes toward the vehicle upper side (upper bag portion 16 side) beyond the tether portion 22; however, the amount of protrusion may be selected. The amount of protrusion may be further reduced or may be further increased as in the case of the alternative embodiment, which will be described later.

As described above, the opening area of the other end 24U (adjacent to the upper bag portion 16) of the tube 24 is smaller than the opening area of one end 24L (adjacent to the lower bag portion 18) of the tube 24. In addition, the inner surface of the lower base fabric 34 is treated with coating for improving airtightness, while the inner surfaces of the pieces of upper base fabric 32 are not treated with such coating. Thus, when the side airbag 12 inflates and deploys, the internal pressure in the lower bag portion 18 is higher than the internal pressure in the upper bag portion 16. In accordance with this, a material that is stronger than those of the pieces of upper base fabric 32 is used for the lower base fabric 34. The tube base fabric 36 uses a material that is stronger than or equivalent to that of the lower base fabric 34.

Next, a method of manufacturing the side airbag according to the first embodiment of the invention will be described. The method of manufacturing the side airbag according to the present embodiment includes a first step to a sixth step shown in FIG. 5 to FIG. 14. The method provides a structure such that the upper bag portion 16 and the lower bag portion 18 are partitioned from each other by the tether portion 22, and the tube 24 extends through the tether portion 22 to the lower bag portion 18 and to the upper bag portion 16. Note that FIG. 5 to FIG. 9, FIG. 11 and FIG. 14 describe the pieces of base fabric in expansion plan in order to clearly show the positions of the sewed portions.

In the first step, as shown in FIG. 6 as the sewed portions S1, the tube base fabric 36 is sewed to the bag inner surface of the lower base fabric 34. As shown in FIG. 5, the lower base fabric 34 and the tube base fabric 36 each have a foldable shape, that is, a line-symmetrical shape, with respect to the fold axis CL. The through holes 34B and 34C are formed, for example, on the fold axis CL in the lower base fabric 34. In addition, the through holes 36B and 36C are formed, for example, on the fold axis CL in the tube base fabric 36 as well. The vehicle upper side through holes 34B and 36B are respectively larger than the vehicle lower side through holes 34C and 36C. This is to make it easy to insert the inflator 14 from the vehicle upper side through holes 34B and 36B into the tube 24 (see FIG. 1).

The upper regions 34U of the lower base fabric 34 are bifurcated. The upper portion of the tube base fabric 36 is also bifurcated in correspondence with the bifurcated upper regions 34U. As shown in FIG. 6, when the tube base fabric 36 is sewed to the lower base fabric 34, the through hole 36B of the tube base fabric 36 is arranged so as to correspond to the through hole 34B of the lower base fabric 34, and the through hole 36C of the tube base fabric 36 is arranged so as to correspond to the through hole 34C of the lower base fabric 34. Then, the tube base fabric 36 is attached to the lower base fabric 34 in such a manner that the peripheral portions of the through holes 34B and 36B are respectively sewed to the peripheral portions of the through holes 34C and 36C.

Note that, in order to suppress gas leakage from the through holes 34B and 36B and the through holes 34C and 36C when the side airbag 12 inflates and deploys, packing (nor shown) may be overlappingly sewed to the through holes 34B and 36B and the through holes 34C and 36C when the sewed portions S1 are formed. The packing allows insertion of the inflator 14 into the tube 24 or mounting of the mounting bracket 42 to the inflator 14, and closes any gaps between the inflator 14 or the mounting bracket 42 and the through holes 34B, 36B, 34C and 36C.

In the second step, as shown in FIG. 7 as the sewed portions S2, the lower end portion 32L of each piece of upper base fabric 32 is sewed to the bag outer surface of the lower base fabric 34 at the lower end (sewed portion S2) of a corresponding one of the upper regions 34U used as the tether portion 22. The upper regions 34U are bifurcated, and the pieces of upper base fabric 32 are sewed to the respective upper regions 34U one by one. The pieces of upper base fabric 32 are line-symmetrical with respect to the fold axis CL.

In the third step, as shown in FIG. 8 as the sewed portions S3, the tube base fabric 36 is sewed to the bag inner sides of the upper regions 34U in the lower base fabric 34. The tube base fabric 36 is sewed to the upper regions 34U of the lower base fabric 34 before the seam 36A between front ends 36F of the folded tube base fabric 36 so as to leave the seam 36A.

In the fourth step, as shown in FIG. 9 and FIG. 10 as the sewed portions S4, the tube base fabric 36 is folded toward the vehicle front side along the fold axis CL and then the front ends 36F of the folded tube base fabric 36 are sewed together to form the cylindrical tube 24. At this time, as shown in FIG. 10, the sewed portions S3 are terminated before the seam 36A, so it is possible to easily sew the sewed portions S4.

In the fifth step, as shown in FIG. 11 and FIG. 12 as the sewed portion S5, the lower base fabric 34 is folded along the fold axis CL, and the upper regions 34U are sewed together to form the tether portion 22. The upper regions 34U of the lower base fabric 34 are sewed together to the sewed portion S3, terminating before the seam 36A, between the tube base fabric 36 and the upper regions 34U.

Specifically, as shown in FIG. 12 and FIG. 13A, the sewed portion S5 extends from the vehicle front side of the upper regions 34U of the lower base fabric 34 to the vehicle rear side, and a rear end portion S51, for example, reaches the front ends S31 of the sewed portions S3, curves toward the vehicle upper side and then terminates near the sewed portions S4.

Note that the shape of the rear end portion S51 of the sewed portion S5 is not limited to the above curved shape. For example, as shown in FIG. 13B, the sewed portion S5 may reach the front ends of the sewed portions S3, fold back toward, for example, the vehicle front side and then terminate near the front ends 36F of the folded tube base fabric 36. Alternatively, as shown in FIG. 13C, the sewed portion S5 may extend beyond the front ends 36F of the folded tube base fabric 36 into the upper base fabric 32 side to terminate.

In the sixth step, as shown in FIG. 14 as the sewed portion S6, outer peripheries of the pieces of upper base fabric 32 are sewed together to form the upper bag portion 16, and an outer periphery of the lower base fabric 34 and another outer periphery of the lower base fabric 34 are sewed together to form the lower bag portion 18. By so doing, as shown in FIG. 2, the side airbag 12 is formed.

Note that, for the first step, the second step and the third step, the order of operations is not limited to the step numbers but the order may be selected. Thus, the second step or the third step may be performed first. The fourth step to the sixth step are performed in order of the step numbers.

In the method of manufacturing the side airbag, the upper regions 34U of the lower base fabric 34 are used as the tether portion 22, so, in comparison with the case where the base fabric of the side airbag 12 is separately formed from the tether, work for sewing the side airbag 12 having the upper bag portion 16 and the lower bag portion 18 is easy, and it is possible to improve mass productivity.

In addition, in the third step, the tube base fabric 36 is sewed to the bag inner sides of the upper regions 34U in the lower base fabric 34. In the fourth step, the tube base fabric 36 is folded toward the vehicle front side along the fold axis CL and then the front ends 36F of the tube base fabric 36 are sewed together to form the cylindrical tube 24. In the fifth step, the lower base fabric 34 is folded along the fold axis CL, and the upper regions 34U are sewed together to form the tether portion 22. Thus, it is possible to improve airtightness between the upper bag portion 16 and the lower bag portion 18.

The first embodiment of the invention is configured as described above, and the operation thereof will be described. As shown in FIG. 2, in the side airbag system 10 according to the present embodiment, the tether portion 22 that serves as a partition between the upper bag portion 16 and the lower bag portion 18 is formed of the upper regions 34U of the lower base fabric 34 and is formed so that the upper regions 34U in the lower base fabric 34 folded along the fold axis CL are sewed together (FIG. 11). Thus, in comparison with the case where the base fabric of the side airbag 12 is separately formed from the tether, work for sewing the side airbag 12 having the upper bag portion 16 and the lower bag portion 18 is easy, and it is possible to improve mass productivity.

In addition, as shown in FIG. 11 and FIG. 12, the tube 24 extends through the tether portion 22 to the lower bag portion 18 and to the upper bag portion 16 and distributes inflation gas between the upper bag portion 16 and the lower bag portion 18, and the tube 24 is formed into a cylindrical shape in such a manner that the tube base fabric 36, sewed to the lower base fabric 34, is further sewed to the upper regions 34U of the lower base fabric 34 and is folded toward the vehicle front side along the fold axis CL, and then the front ends 36F are sewed together in the longitudinal direction of the tube 24. On the other hand, the tether portion 22 is formed in such a manner that the upper regions 34U of the lower base fabric 34 folded along the fold axis CL are sewed together. Thus, it is possible to improve airtightness between the upper bag portion 16 and the lower bag portion 18.

The sewed portions S3 between the tube base fabric 36 and the upper regions 34U of the lower base fabric 34 are formed so that the front ends S31 are terminated before the seam 36A between the front ends 36F of the tube base fabric 36 in order to make it easy to sew the front ends 36F of the folded tube base fabric 36 (sewed portions S4). However, as shown in FIG. 11 to FIG. 13, the rear end portion S51 of the sewed portion S5 between the upper regions 34U of the lower base fabric 34 reaches the front ends S31 of the sewed portions S3. This closes gaps 46 between the sewed portions S3 and the sewed portions S4 shown in FIG. 10. By so doing, fluid communication of gas between the upper bag portion 16 and the lower bag portion 18 via the gaps 46 is suppressed, and it is possible to further improve airtightness.

In this way, with the side airbag system 10, it is possible to improve mass productivity by making it easy to sew the side airbag 12 having the upper bag portion 16 and the lower bag portion 18 that are partitioned from each other, and it is possible to improve airtightness between the upper bag portion 16 and the lower bag portion 18.

Next, the operation in the event of a side impact crash will be described. As the airbag ECU determines occurrence of a side impact crash on the basis of a signal from the crash sensor (not shown), the airbag ECU supplies activating electric current to the inflator 14. The inflator 14 is activated with the supplied activating electric current, and discharges large amount of gas from a gas discharging hole of the inflator 14 (not shown). As the gas is supplied into the side airbag 12, the side airbag 12 swells from the seat back 28, and inflates and deploys toward the lateral side of the occupant 30.

Here, as shown in FIG. 1, the inflator 14 is arranged inside the tube 24, and the tube 24 is supplied with inflation gas from the inflator 14 to inflate and deploy prior to the upper bag portion 16 and the lower bag portion 18 in the event of a side impact crash. Thus, it is possible to initially restrain the occupant 30 by the tube 24 in the event of a side impact crash. In addition, it is possible to regulate restraining force at the time of initial restraining operation by the position of the tube 24. Furthermore, the side airbag 12 may be forcibly deployed by the tube 24 in the vehicle vertical direction, so inflation and deployment of the side airbag 12 are quick and stable.

Supplementarily, in the present embodiment, the tube 24 is made of fabric that is able to inflate and deploy together with the side airbag 12, so, in comparison with the case where gas is distributed by a metal retainer (not shown), it is possible to elongate the tube 24 in the vehicle vertical direction. Flow of gas may be controlled by arrangement, length, shape, or the like, of the tube 24.

Gas supplied from the inflator 14 is distributed from the opening 38 of one end 24L of the tube 24 into the lower bag portion 18 and from the opening 40 of the other end 24U into the upper bag portion 16. By so doing, the lower bag portion 18 and the upper bag portion 16 each inflate and deploy. At this time, in the present embodiment, the upper bag portion 16 covers both the chest 30C and shoulder 30S of the occupant 30 seated on the vehicle seat 26, and the lower bag portion 18 covers the hip 30W of the occupant 30. Thus, in the event of a side impact crash, the upper bag portion 16 is able to restrain both the chest 30C and shoulder 30S of the occupant 30, and the lower bag portion 18 is able to restrain the hip 30W of the occupant 30.

Particularly, as shown in FIG. 3, in the present embodiment, the tether portion 22 is provided to serve as a partition between the upper bag portion 16 and the lower bag portion 18. Thus, in comparison with the case where the bag is partitioned by sewing pieces of base fabric together, it is possible to ensure larger bag thickness at the tether portion 22 when the side airbag 12 inflates and deploys.

In addition, when the side airbag 12 inflates and deploys, the internal pressure in the lower bag portion 18 is higher than the internal pressure in the upper bag portion 16. Thus, the hip 30W that relatively withstands a lateral load F (FIG. 4) within the body of the occupant 30 may be intensively restrained by the lower bag portion 18.

Furthermore, in the present embodiment, the inner surface of the lower base fabric 34 is treated with coating for improving airtightness, while the inner surfaces of the pieces of upper base fabric 32 are not treated with such coating. With the above simple configuration, when the side airbag 12 inflates and deploys, a difference in internal pressure between the upper bag portion 16 and the lower bag portion 18 may be maintained over a further long period of time.

Note that, as shown in FIG. 4, the tube 24 is made of fabric, so, even when gas in the lower bag portion 18 attempts to flow toward the upper bag portion 16 through the tube 24 when the lateral load F is applied to the lower bag portion 18, one end 24L of the tube 24 closes as indicated by the alternate long and two short dashed lines. Thus, such flow of gas is suppressed, and a difference in internal pressure between the upper bag portion 16 and the lower bag portion 18 may be maintained.

Figure 15:
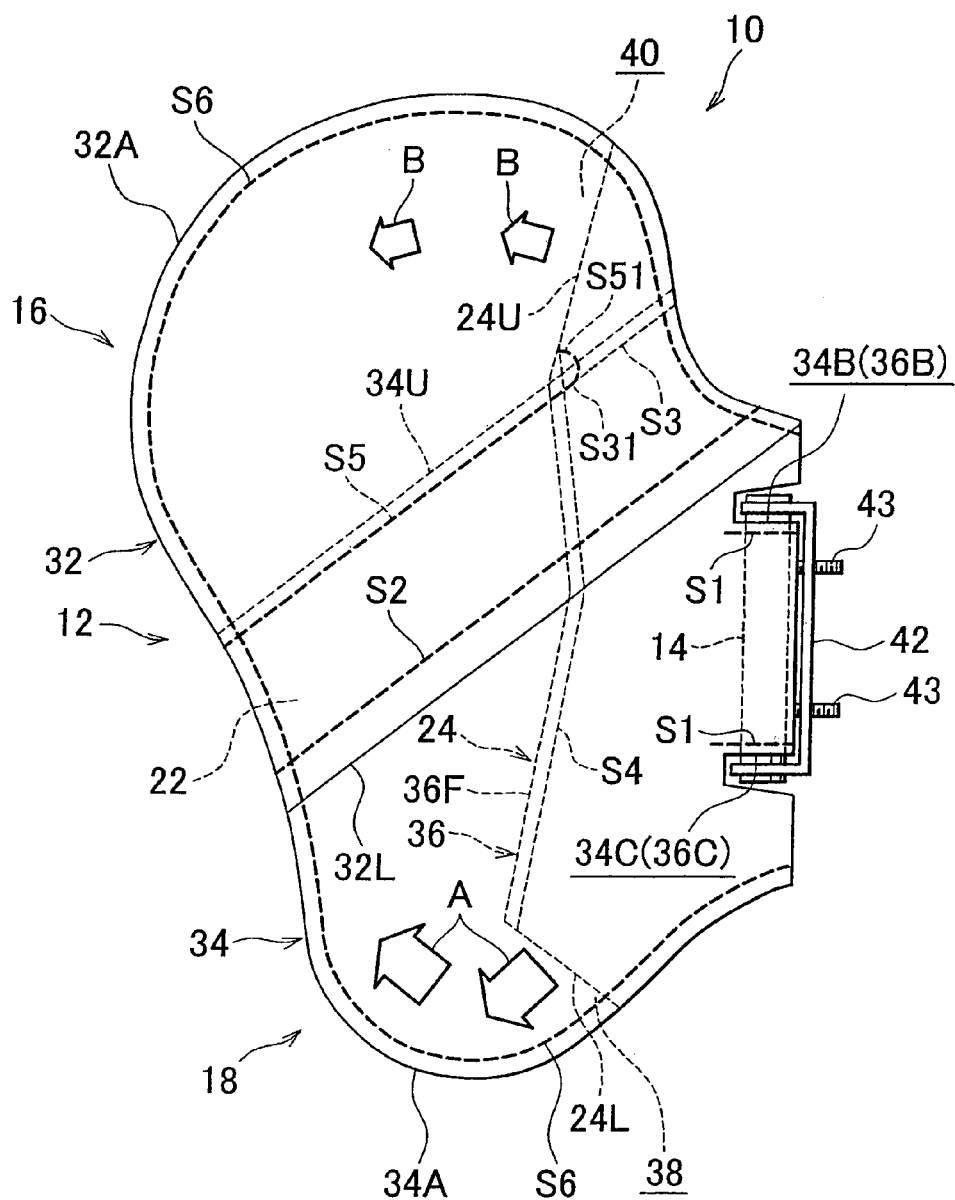
FIG. 15 is a side view that shows a side airbag system according to a first alternative embodiment to the first embodiment of the invention.

Next, alternative embodiments of the side airbag system according to the first embodiment of the invention will be described. In a first alternative embodiment shown in FIG. 15, when the side airbag 12 inflates and deploys, one end 24L of the tube 24 opens at a location corresponding to the hip 30W (see FIG. 1) of the occupant 30, and the other end 24U of the tube 24 opens at a location corresponding to the shoulder 30S (see FIG. 1) of the occupant 30. That is, in comparison with the structure shown in FIG. 2, the location of the other end 24U of the tube 24 is high, and is open near the shoulder 30S (see FIG. 1) of the occupant 30.

Thus, gas supplied from the inflator 14 into the tube 24 is supplied from the opening 38 of one end 24L located laterally to the hip 30W of the occupant 30 into the lower bag portion 18 in the arrow A direction. In addition, gas is supplied from the opening 40 of the other end 24U located laterally to the shoulder 30S of the occupant 30 into the upper bag portion 16 in the arrow B direction. By so doing, in the event of a side impact crash, the hip 30W and shoulder 30S of the occupant 30 may be quickly restrained.

Figure 16:
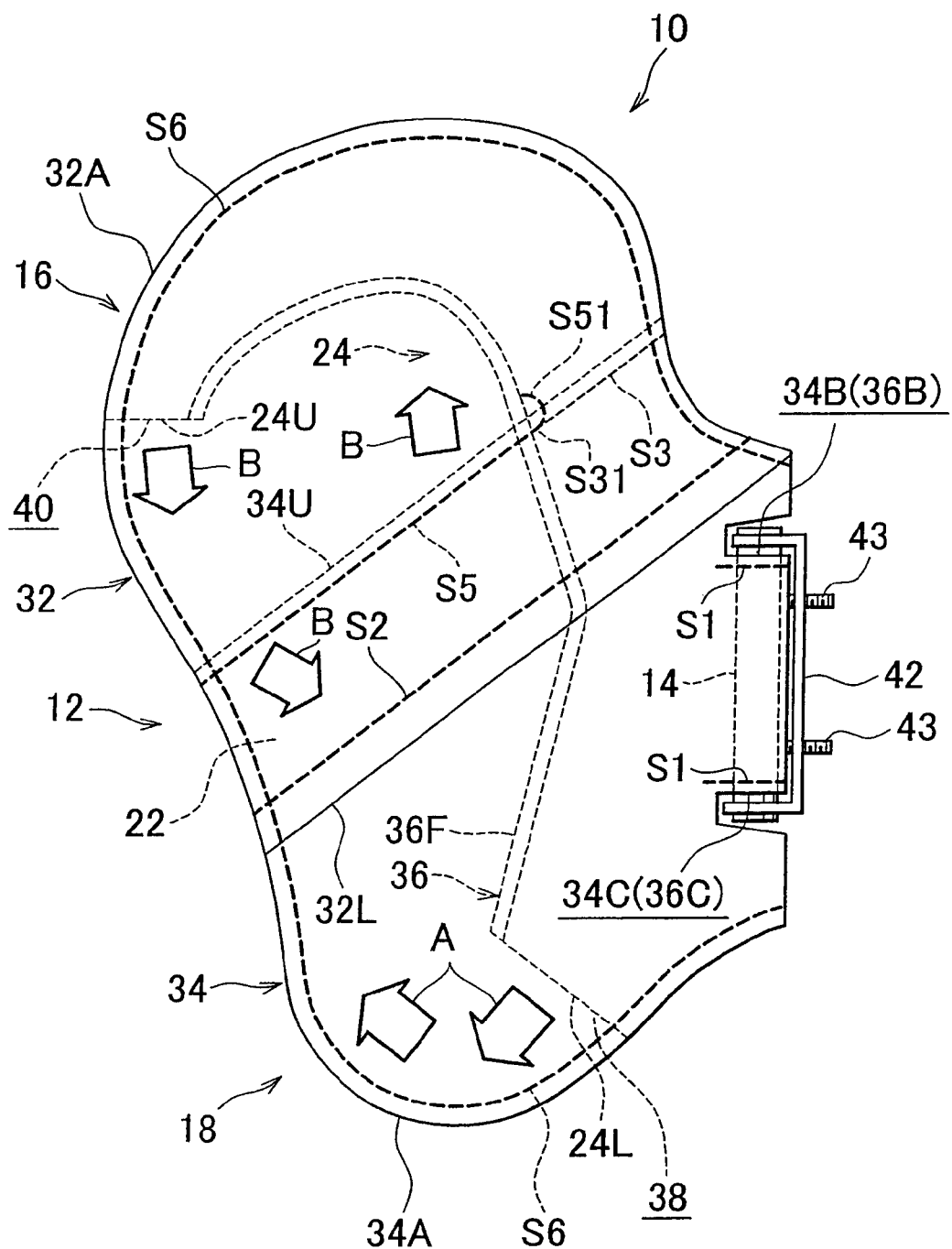
FIG. 16 is a side view that shows a side airbag system according to a second alternative embodiment to the first embodiment of the invention.

In a second alternative embodiment shown in FIG. 16, when the side airbag 12 inflates and deploys, one end 24L of the tube 24 opens at a location corresponding to the hip 30W (see FIG. 1) of the occupant 30, and the other end 24U of the tube 24 extends toward the vehicle front side along the outer periphery of the upper bag portion 16 and opens at a location corresponding to the chest 30C (see FIG. 1) of the occupant 30. The opening area of the other end 24U of the tube 24 is smaller than the opening area of one end 24L of the tube 24. Specifically, the other end of the tube 24 extends toward the vehicle front side along the outer periphery 32A of the upper base fabric 32 and opens, for example, toward the vehicle lower side.

Gas supplied from the inflator 14 into the tube 24 is supplied from the opening 38 of one end 24L located laterally to the hip 30W of the occupant 30 into the lower bag portion 18 in the arrow A direction. In addition, gas supplied into the tube 24 is supplied from the opening 40 of the other end 24U at a location corresponding to the chest 30C (see FIG. 1) of the occupant 30 into the upper bag portion 16 in the arrow B direction. Thus, in the event of a side impact crash, the hip 30W and chest 30C of the occupant 30 may be quickly restrained.

Here, as shown in FIG. 16, the width of the tube 24 in side view of the vehicle is gradually narrowed from near the upper end of the upper bag portion 16 toward the other end 24U. Thus, the opening area of the other end 24U is smaller than the opening area of one end 24L. By so doing, the amount of gas distributed to the upper bag portion 16 may be controlled so as to be smaller than the amount of gas distributed to the lower bag portion 18. By so controlling the amount of gas distributed, the chest 30C of the occupant 30 may be appropriately restrained by the upper bag portion 16, and the hip 30W of the occupant 30 may be appropriately restrained by the lower bag portion 18.

Figure 17:
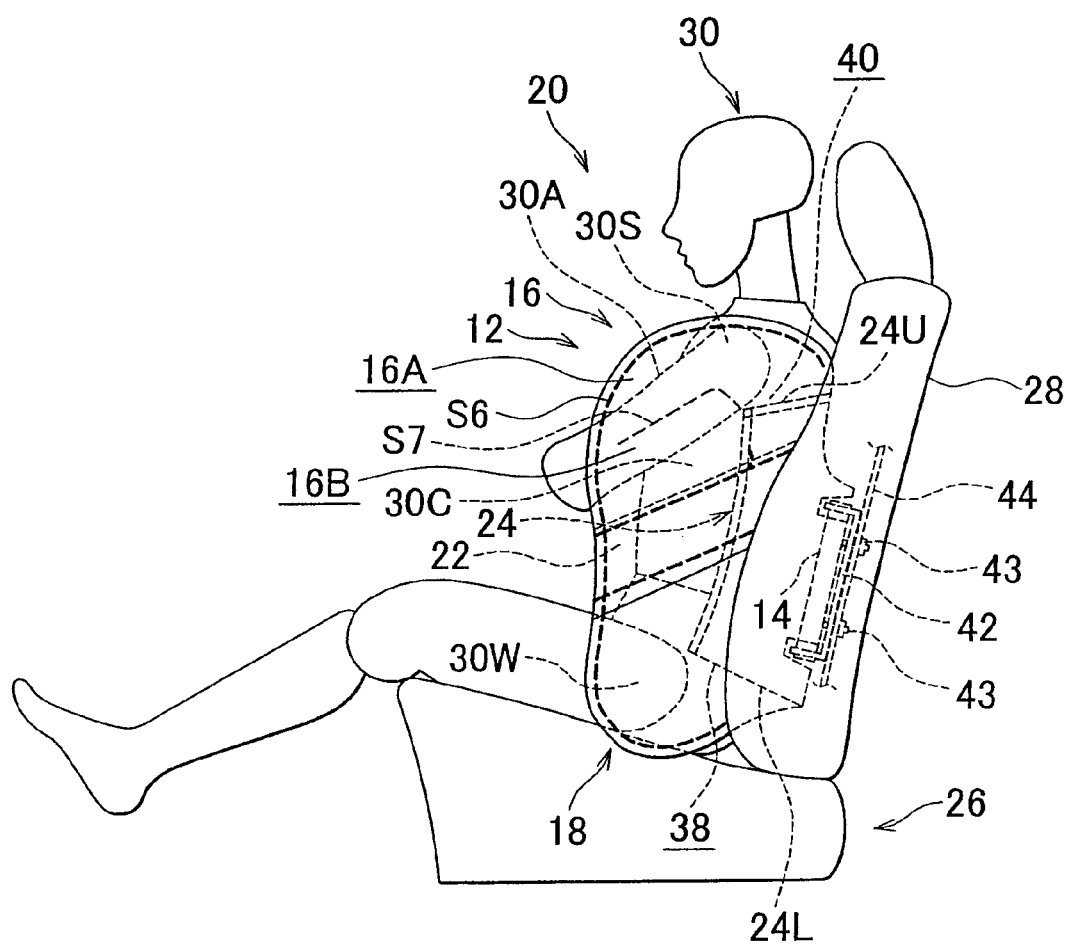
FIG. 17 is a side view that shows a state where a side airbag is inflated and deployed to a lateral side of an occupant seated on a vehicle seat according to a second embodiment of the invention.
Figure 18:
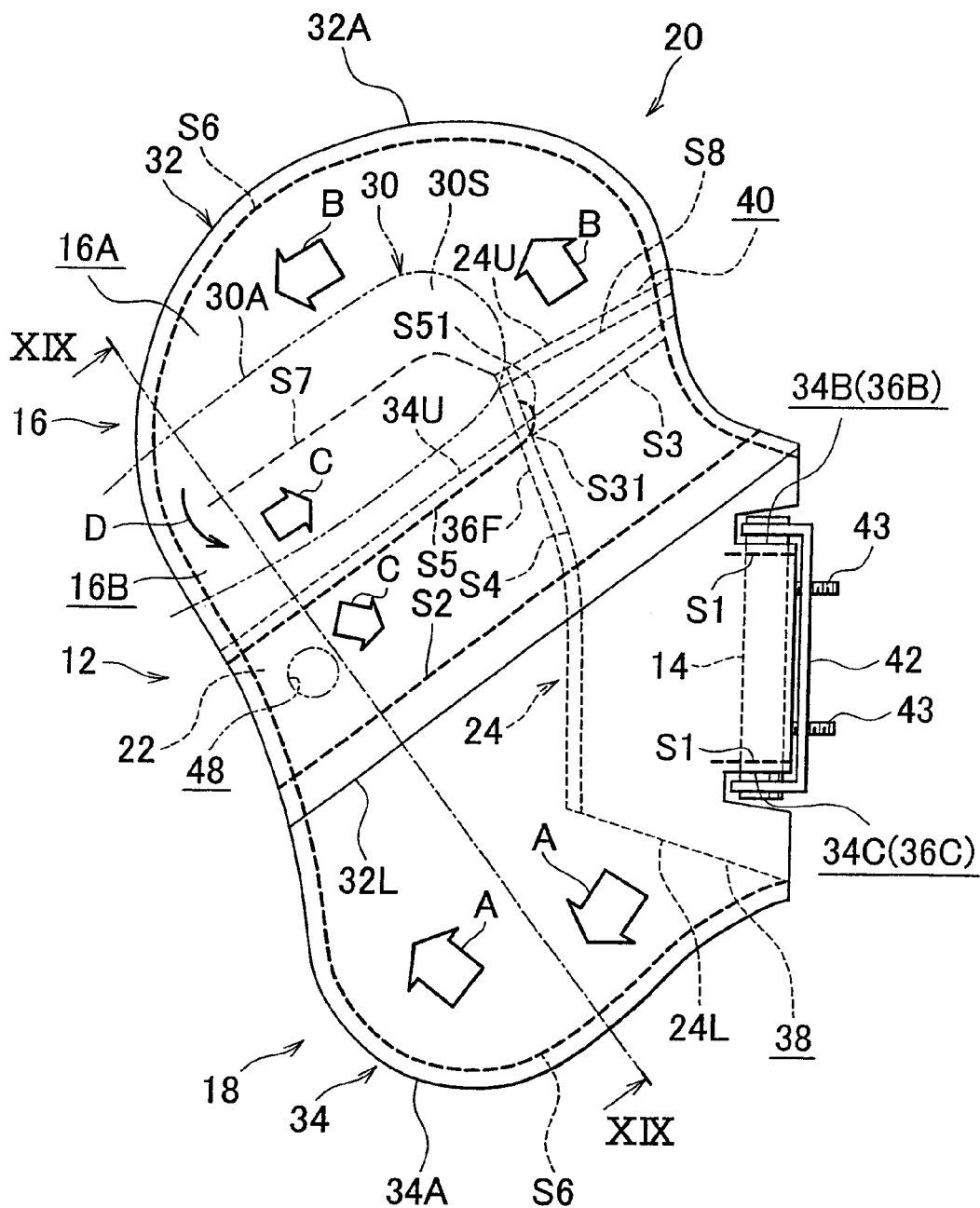
FIG. 18 is a side view that shows the side airbag according to the second embodiment of the invention.
Figure 19:
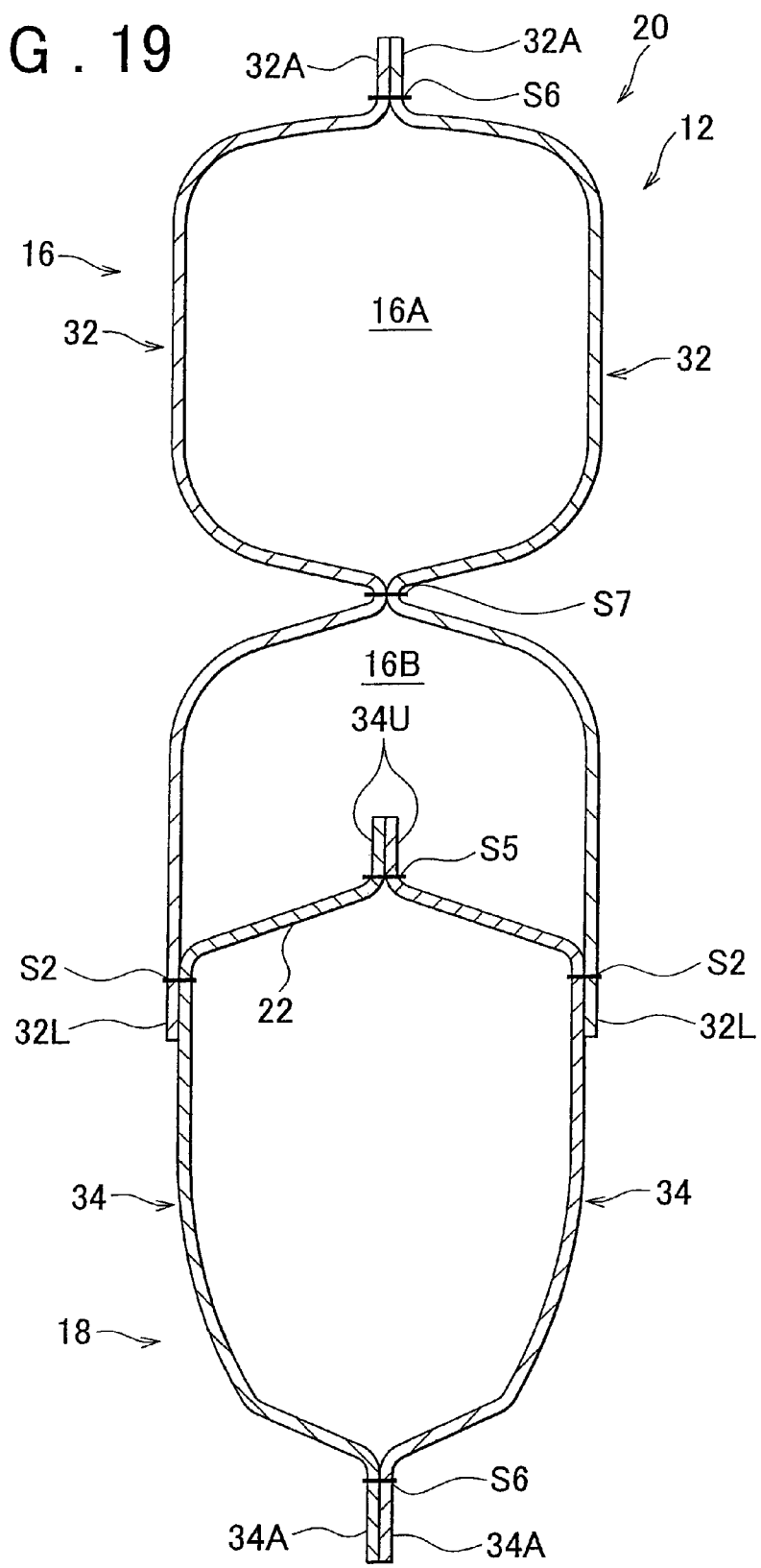
FIG. 19 is an enlarged cross-sectional view that is taken along the line XIX-XIX in FIG. 18, showing the side airbag according to the second embodiment of the invention.

Next, a side airbag system according to a second embodiment of the invention will be described. As shown in FIG. 17 and FIG. 18, in the side airbag system 20 according to the second embodiment of the invention, the upper bag portion 16 has an additional sewed portion S7. The additional sewed portion S7 extends from the vehicle front side end of the opening 40 at the other end 24U of the tube 24 toward the vehicle front side and then terminates before the sewed portion S6 at the outer periphery of the upper bag portion 16. The additional sewed portion S7 is provided at a portion corresponding to the upper arm 30A of the occupant 30. As shown in FIG. 19, the upper bag portion 16 is partitioned by the additional sewed portion S7 into an uppermost bag portion 16A and an intermediate bag portion 16B. The additional sewed portion S7 extends from the vehicle front side end of the opening 40 of the tube 24 obliquely upward toward the vehicle front side by a predetermined length, and then bends to further extend obliquely downward.

As shown in FIG. 17, when the side airbag 12 inflates and deploys, the lower bag portion 18 covers the hip 30W of the occupant 30, the intermediate bag portion 16B covers the chest 30C of the occupant 30, and the uppermost bag portion 16A covers the shoulder 30S of the occupant 30. In addition, at this time, among the lower bag portion 18, the intermediate bag portion 16B and the uppermost bag portion 16A, the internal pressure in the lower bag portion 18 is the highest, and the internal pressure in the intermediate bag portion 16B is the lowest.

As shown in FIG. 18, a vent hole 48 is formed at the front side of the upper base fabric 32 in the intermediate bag portion 16B. The vent hole 48 is, for example, closed during normal times, and opens when the internal pressure in the intermediate bag portion 16B is higher than or equal to a predetermined value at the time when the occupant 30 is restrained. In addition, the vent hole 48 is desirably set at a location that hardly contacts the occupant 30 and to which a pressure is applied last at the time when the chest 30C of the occupant 30 is restrained. By delaying the timing at which the vent hole 48 is opened, discharge of gas through the vent hole 48 at the initial stage of restraining operation is suppressed to effectively use the gas discharged from the inflator 14.

In addition, the other end 24U of the tube 24 may be sewed by a tear seam S8 that tears when a force larger than or equal to a predetermined value is applied. This is because, by delaying the timing at which gas flows from the tube 24 into the upper bag portion 16 at the time when the side airbag 12 inflates and deploys, the internal pressure at the initial stage of inflation and deployment of the lower bag portion 18 is further increased to make it possible to further increase initial restraining force applied to the hip 30W of the occupant 30.

Figure 20:
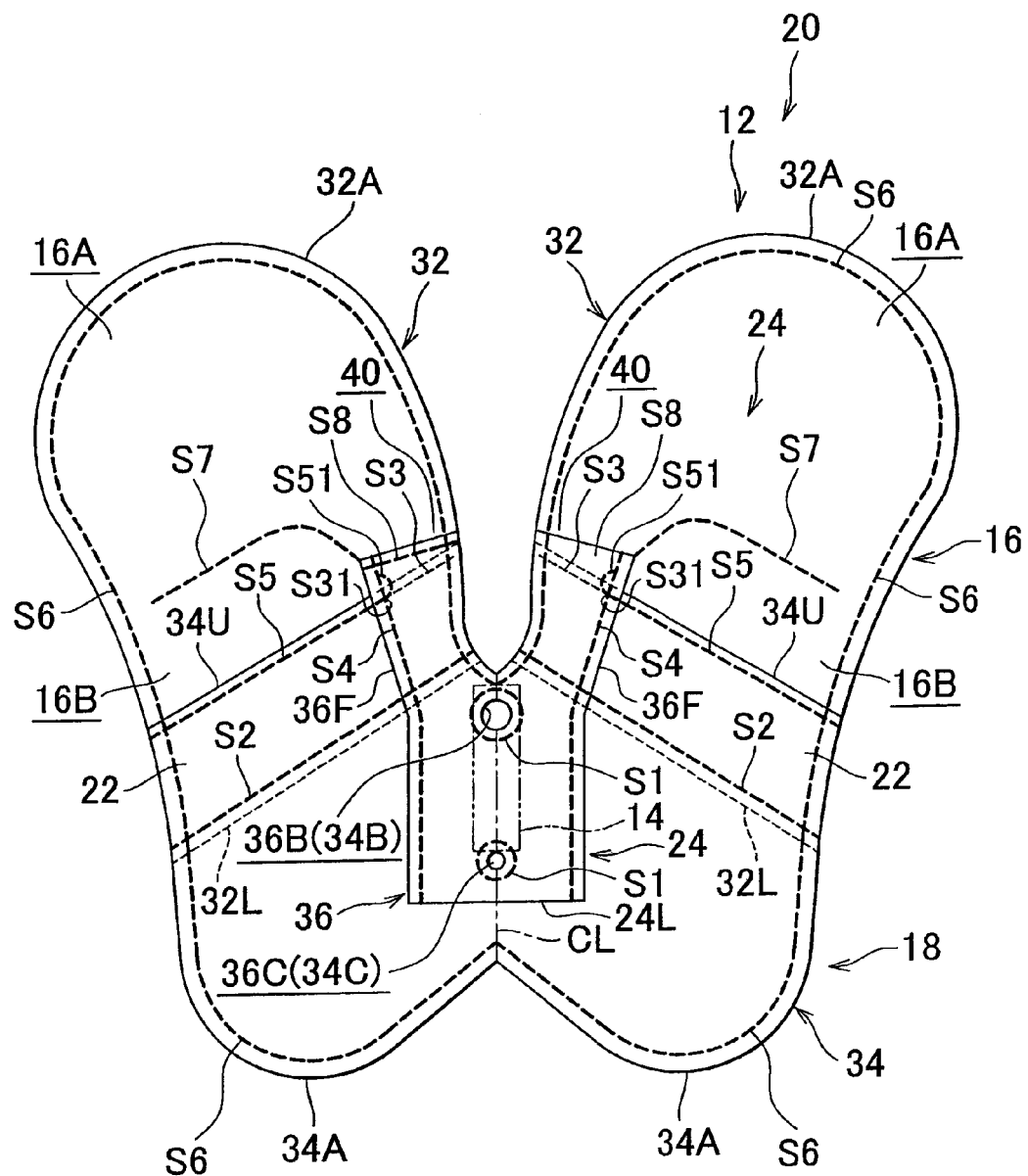
FIG. 20 is an expansion plan that shows that, in a seventh step according to the second embodiment of the invention, an additional sewed portion that extends from a vehicle front side end of an opening at the other end of the tube toward a vehicle front side and that terminates before the sewed portion at the outer periphery of the upper bag portion is provided.
Figure 21A:
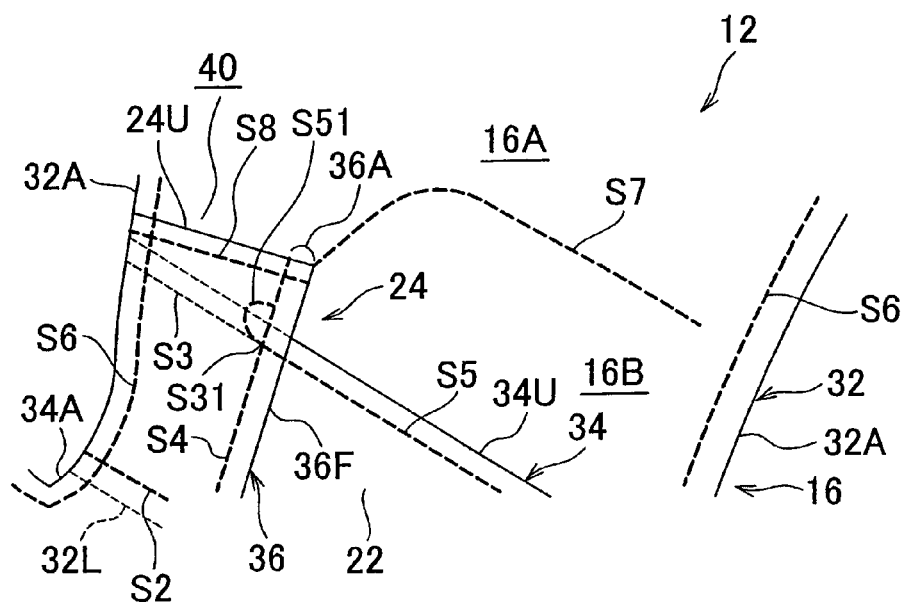
FIG. 21A is an enlarged expansion plan that shows an example of the additional sewed portion in the seventh step according to the second embodiment of the invention.

Next, a method of manufacturing the side airbag according to the second embodiment of the invention will be described. The present embodiment includes a seventh step in addition to the first step to sixth step described in the first embodiment. As shown in FIG. 20 and FIG. 21A, in the seventh step, the upper bag portion 16 is provided with the additional sewed portion S7 that extends from the vehicle front side end of the opening 40 at the other end 24U of the tube 24 toward the vehicle front side and that terminates before the sewed portion. S6 at the outer periphery of the upper bag portion 16. The additional sewed portion S7 partitions the upper bag portion 16 into the uppermost bag portion 16A and the intermediate bag portion 16B.

Figure 21B:
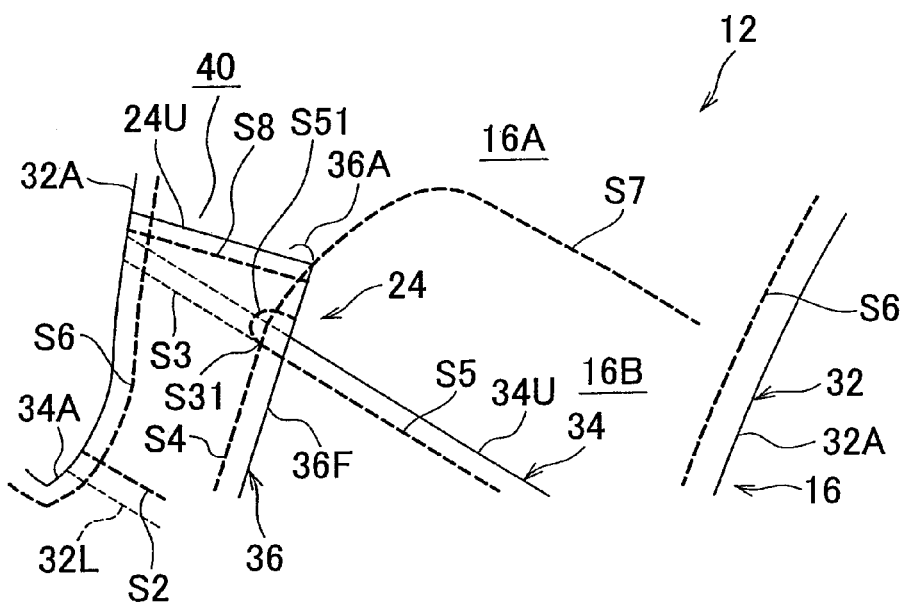
FIG. 21B is an enlarged expansion plan that shows another example of the additional sewed portion in the seventh step according to the second embodiment of the invention.

In FIG. 21A, the additional sewed portion S7 is formed from the corner of the vehicle front side at the other end 24U of the tube 24; however, the additional sewed portion S7 is not limited to this configuration. For example, as shown in FIG. 21B, the additional sewed portion S7 may be formed from near the rear end S51 of the sewed portion S5. In this case, the front ends 36F of the tube base fabric 36 may be sewed together by the additional sewed portion S7. Thus, the upper ends of the sewed portions S4 may be, for example, set near the sewed portions S3, and the length of each sewed portion S4 may be reduced.

In the seventh step, the additional sewed portion S7 is provided so as to extend from the vehicle front side end of the opening 40 at the other end 24U of the tube 24 toward the vehicle front side and terminate before the sewed portion S6 at the outer periphery of the upper bag portion 16, and the additional sewed portion S7 partitions the upper bag portion 16 into the uppermost bag portion 16A and the intermediate bag portion 16B. Thus, it is possible to easily sew the side airbag 12 having three chambers.

The other portions are similar to those of the first embodiment, so like reference numerals in the drawings denote similar components, and the description thereof is omitted.

The present embodiment is configured as described above, and the operation of the present embodiment will be described below. As shown in FIG. 18, in the side airbag system 20 according to the present embodiment, gas generated from the inflator 14 in the event of a side impact crash is supplied from the opening 38 of one end 24L of the tube 24 into the lower bag portion 18 in the arrow A direction. In addition, gas is supplied from the opening 40 of the other end 24U of the tube 24 to the uppermost bag portion 16A of the upper bag portion 16 in the arrow B direction. Then, the gas flows into the intermediate bag portion 16B between the front end of the additional sewed portion S7 and the sewed portion of the outer periphery of the upper bag portion 16 in the arrow D direction and further in the arrow C direction. By so doing, the lower bag portion 18 and the uppermost bag portion 16A and intermediate bag portion 16B of the upper bag portion 16 inflate and deploy.

At this time, as shown in FIG. 17, the lower bag portion 18 covers the hip 30W of the occupant 30, the intermediate bag portion 16B covers the chest 30C of the occupant 30, and the uppermost bag portion 16A covers the shoulder 30S of the occupant 30. Furthermore, in the side airbag system 20, among the lower bag portion 18, the intermediate bag portion 16B and the uppermost bag portion 16A, the internal pressure in the lower bag portion 18 is the highest, and the internal pressure in the intermediate bag portion 16B is the lowest. Thus, it is possible to obtain restraining force based on how much parts of the body of the occupant 30 withstand a lateral load in the event of a side impact crash, so the hip 30W, chest 30C and shoulder 30S of the occupant 30 may be appropriately restrained.

In the present embodiment, as shown in FIG. 19, the additional sewed portion S7 sews the pieces of upper base fabric 32 together, so the bag thickness at the location of the additional sewed portion S7 reduces at the time when the side airbag 12 inflates and deploys. Then, as shown in FIG. 17 and FIG. 18, the additional sewed portion S7 is set at a portion corresponding to the upper arm 30A of the occupant 30, so a press of the side airbag 12 on the upper arm 30A is suppressed in the event of a side impact crash. Therefore, it is possible to suppress a lateral load applied to the chest 30C via the upper arm 30A.

The intermediate bag portion 16B has the vent hole 48 (FIG. 18). The vent hole 48 is closed during normal times, and opens when the internal pressure in the intermediate bag portion 16B is higher than or equal to a predetermined value. Gas flows into the intermediate bag portion 16B last. Thus, by delaying the timing at which the vent hole 48 is opened, discharge of gas from the vent hole 48 at the initial stage of restraining operation is suppressed to make it possible to effectively use gas discharged from the inflator 14. When the internal pressure in the intermediate bag portion 16B is higher than or equal to a predetermined value, the vent hole 48 deploys to allow gas in the intermediate bag portion 16B to be discharged through the vent hole 48. By so doing, the internal pressure in the intermediate bag portion 16B is reduced to make it possible to further reduce restraining force applied to the chest 30C.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A side airbag system comprising:
    a side airbag that includes
    an upper bag portion that is formed of a piece of upper base fabric and that is located on a vehicle upper side;
    a lower bag portion that is formed of a piece of lower base fabric and that is located on a vehicle lower side of the upper bag portion;
    a tether portion that is formed of upper regions of the lower base fabric and that serves as a partition between the upper bag portion and the lower bag portion; and
    a tube that is formed of a piece of tube base fabric, that extends through the tether portion to the lower bag portion and to the upper bag portion, that has an opening at one end located adjacent to the lower bag portion and an opening at the other end located adjacent to the upper bag portion, and that distributes inflation gas between the upper bag portion and the lower bag portion, wherein
    the side airbag is supplied with gas to inflate and deploy in the event of a side impact crash,
    a lower end portion of the upper base fabric is sewed to a bag outer surface at lower ends of the upper regions, used as the tether portion, in the lower base fabric,
    the tube is formed into a cylindrical shape in such a manner that the tube base fabric, sewed to the lower base fabric, is further sewed to the upper regions of the lower base fabric and folded toward a vehicle front side along a fold axis and then front ends of the folded tube base fabric are sewed together in a longitudinal direction of the tube,
    the tether portion is formed in such a manner that the upper regions of the lower base fabric folded along the fold axis are sewed together, and
    the upper bag portion is formed in such a manner that an outer periphery of the upper base fabric and another outer periphery of the upper base fabric are sewed together, and the lower bag portion is formed in such a manner that an outer periphery of the lower base fabric and another outer periphery of the lower base fabric are sewed together.

2. The side airbag system according to claim 1, wherein
    the tube base fabric is sewed to the upper region of the lower base fabric before a seam between the front ends of the folded tube base fabric so as to leave the seam to form a sewed portion, and
    the upper regions of the lower base fabric are sewed together to the sewed portion, terminating before the seam, between the tube base fabric and the upper regions of the lower base fabric.

3. The side airbag system according to claim 1, wherein the upper bag portion covers at least one of a chest and shoulder of an occupant seated on a vehicle seat, and the lower bag portion covers a hip of the occupant.

4. The side airbag system according to claim 3, further comprising an inflator that is arranged inside the tube, wherein
    the tube is supplied with inflation gas from the inflator to inflate and deploy prior to the upper bag portion and the lower bag portion in the event of a side impact crash.

5. The side airbag system according to claim 4, wherein, when the side airbag inflates and deploys, the one end of the tube, located adjacent to the lower bag portion, opens at a location corresponding to the hip of the occupant, and the other end of the tube, located adjacent to the upper bag portion, opens at a location corresponding to the shoulder of the occupant.

6. The side airbag system according to claim 4, wherein, when the side airbag inflates and deploys, the one end of the tube, located adjacent to the lower bag portion, opens at a location corresponding to the hip of the occupant, and the other end of the tube, located adjacent to the upper bag portion, extends toward a vehicle front side along the outer periphery of the upper bag portion and opens at a location corresponding to the chest of the occupant.

7. The side airbag system according to claim 6, wherein an opening area of the other end of the tube, located adjacent to the upper bag portion, is smaller than an opening area of the one end of the tube, located adjacent to the lower bag portion.

8. The side airbag system according to claim 3, wherein, when the side airbag inflates and deploys, an internal pressure in the lower bag portion is higher than an internal pressure in the upper bag portion.

9. The side airbag system according to claim 8, wherein the lower base fabric is made of a material that is stronger than that of the upper base fabric.

10. The side airbag system according to claim 3, further comprising an additional sewed portion provided for the upper bag portion, wherein the additional sewed portion extends from a vehicle front side end of the opening at the other end of the tube, located adjacent to the upper bag portion, toward a vehicle front side and terminates before a sewed portion at the outer periphery of the upper bag portion, wherein
    the upper bag portion is partitioned by the additional sewed portion into an uppermost bag portion and an intermediate bag portion.

11. The side airbag system according to claim 10, wherein the additional sewed portion is set at a portion corresponding to an upper arm of the occupant.

12. The side airbag system according to claim 10, wherein, when the side airbag inflates and deploys, the lower bag portion covers the hip of the occupant, the intermediate bag portion covers the chest of the occupant, and the uppermost bag portion covers the shoulder of the occupant.

13. The side airbag system according to claim 10, wherein the intermediate bag portion has a vent hole.

14. The side airbag system according to claim 10, wherein, when the side airbag inflates and deploys, an internal pressure in the lower bag portion is the highest and an internal pressure in the intermediate bag portion is the lowest among the lower bag portion, the intermediate bag portion and the uppermost bag portion.

15. The side airbag system according to claim 1, wherein an inner surface of the lower base fabric is treated with coating for improving airtightness, and an inner surface of the upper base fabric is not treated with such coating.

16. A method of manufacturing a side airbag, comprising:
a first step of sewing a piece of tube base fabric to a bag inner surface of a piece of lower base fabric;
a second step of sewing a lower end portion of a piece of upper base fabric to a bag outer surface at lower ends of upper regions, used as a tether portion, in the lower base fabric;
a third step of sewing the tube base fabric to bag inner sides of the upper regions in the lower base fabric;
a fourth step of folding the tube base fabric toward a vehicle front side along a fold axis and then sewing front ends of the folded tube base fabric together to form a cylindrical tube;
a fifth step of folding the lower base fabric along the fold axis and then sewing the upper regions of the lower base fabric together to form the tether portion; and
a sixth step of sewing an outer periphery of the lower base fabric and another outer periphery of the lower base fabric together to form a lower bag portion and sewing an outer periphery of the upper base fabric and another outer periphery of the upper base fabric together to form an upper bag portion, wherein
the tether portion serves as a partition between the upper bag portion and the lower bag portion, and the tube extends through the tether portion to the lower bag portion and to the upper bag portion.

17. The method of manufacturing a side airbag according to claim 16, wherein
the tube base fabric is sewed to the upper regions of the lower base fabric in the third step before a seam between the front ends of the folded tube base fabric so as to leave the seam to form a sewed portion, and
the upper regions of the lower base fabric are sewed together to the sewed portion, terminating before the seam, between the tube base fabric and the upper regions of the lower base fabric.

18. The method of manufacturing a side airbag according to claim 16, further comprising a seventh step of providing an additional sewed portion for the upper bag portion so as to extend from a vehicle front side end of an opening at an end of the tube, located adjacent to the upper bag portion, toward a vehicle front side and terminate before a sewed portion at the outer periphery of the upper bag portion, wherein
the additional sewed portion partitions the upper bag portion into an uppermost bag portion and an intermediate bag portion.

19. The method of manufacturing a side airbag according to claim 16, wherein the first step to the third step are processed in selected order, and the fourth step to the sixth step are processed in order of step numbers.

* * * * *